US009842362B2

(12) United States Patent
Kim et al.

(10) Patent No.: US 9,842,362 B2
(45) Date of Patent: Dec. 12, 2017

(54) HOME APPLIANCE AND METHOD FOR SHOPPING FOR GOODS USING THE SAME

(71) Applicant: LG Electronics Inc., Seoul (KR)

(72) Inventors: Yanghwan Kim, Changwon-si (KR); Wonhee Cheong, Changwon-si (KR); Seonghwan Noh, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 864 days.

(21) Appl. No.: 14/144,009

(22) Filed: Dec. 30, 2013

(65) Prior Publication Data

US 2014/0195383 A1 Jul. 10, 2014

(30) Foreign Application Priority Data

Jan. 7, 2013 (KR) ........................ 10-2013-0001764

(51) Int. Cl.

| | |
|---|---|
| ***G06Q 30/00*** | (2012.01) |
| ***G06Q 30/06*** | (2012.01) |
| ***G06F 3/0482*** | (2013.01) |
| ***G06F 3/0488*** | (2013.01) |
| ***F25D 29/00*** | (2006.01) |

(52) U.S. Cl.

CPC ......... *G06Q 30/0633* (2013.01); *F25D 29/00* (2013.01); *G06F 3/0482* (2013.01); *G06F 3/04883* (2013.01); *G06Q 30/0643* (2013.01); *F25D 2500/06* (2013.01)

(58) Field of Classification Search

CPC .... G06Q 30/02; G06Q 30/06; G06Q 30/0601; G06Q 30/0633; G06Q 30/0641; G06Q 20/12; G06Q 20/123; G06Q 20/20; G06Q 20/32; G06Q 30/00; G06Q 30/0267; G06Q 10/087; G06Q 30/0253; G06Q 30/0603

See application file for complete search history.

(56) References Cited

U.S. PATENT DOCUMENTS

2010/0306080 A1* 12/2010 Trandal .................. G06Q 10/10 705/26.8
2013/0191243 A1* 7/2013 Jung .................. G06Q 30/0633 705/26.8

* cited by examiner

*Primary Examiner* — Michelle L Le
(74) *Attorney, Agent, or Firm* — Dentons US LLP

(57) ABSTRACT

A home appliance includes an input unit arranged on one side of a main body of the home appliance and to receive a designation command for at least one product, a communication unit to transmit information to a server related to a purchase site or receive information from the server related to the purchase site, an output unit to display, on a display screen, a purchase list according to the designation command, and a control unit to control the output unit to display on the display screen.

14 Claims, 44 Drawing Sheets

Fig.4a

- WHEN THERE IS NO SELECTED FOOD ITEM/
WHEN THERE IS NO STORED FOOD IN SHOPPING LIST

| SHOPPING | ADD TO REFRIGERATOR COMPARTMENT | ADD TO FREEZER COMPARTMENT | DELETE |
|---|---|---|---|

Fig.4b

- WHEN THERE IS SELECTED FOOD ITEM

| SHOPPING | ADD TO REFRIGERATOR COMPARTMENT | ADD TO FREEZER COMPARTMENT | DELETE |
|---|---|---|---|

Fig.6a

TWO FOODS WERE ADDED TO
THE REFRIGERATOR COMPARTMENT

Fig.6b

TWO FOODS WERE ADDED TO
THE FREEZER COMPARTMENT

HOME APPLIANCE AND METHOD FOR SHOPPING FOR GOODS USING THE SAME

CROSS-REFERENCE TO RELATED APPLICATIONS

The present application claims priority under 35 U.S.C. 119 and 35 U.S.C. 365 to Korean Patent Application No. 10-2013-0001764 (filed on Jan. 7, 2013), which is hereby incorporated by reference in its entirety.

BACKGROUND

The present disclosure relates to a home appliance and a method for purchasing products using the same.

Electronic products for use in home (hereinafter, referred to as home appliances) such as refrigerators and air conditioners provide convenience to users by performing characteristic functions. Recently, a home network for connecting home appliances through a single network has been developed so that a user may remotely control the home appliances through the home network. Therefore, the user may turn on/off or control the home appliances even though the user is not at home. However, the control of the home appliances through the home network is limited to intrinsic functions of the home appliances.

Device management refers to a technology for providing various functions such as user-customized setting, remote management, and update to various electronic devices (herein, referred to as home appliances). The device management technology may be used during a manufacturing process of a product or may be used to initially set the product after purchasing the product, perform batch-update with respect to errors or corrections, and remotely manage the product.

Standardization technologies established by the open mobile appliance (OMA) are used for application programs and services in the fields of mobile communication. The OMA addresses issues of mobile web, web browsing, Digital Rights Management (DRM) solution, Internet Protocol (IP) multimedia, device management, mobile broadcast, and mobile document standardization in order to improve interoperability between mobile data services. In particular, technology standardization by the OMA for the device management allows process such as firmware update, software download, new service, and error correction to be performed wirelessly.

SUMMARY

Embodiments provide a home appliance and a method for purchasing products using the same.

In one embodiment, a home appliance includes an input unit arranged on one side of a main body of the home appliance and receiving a designation command for at least one product, a communication unit to transmit information to a server related to a purchase site or receive information from the server related to the purchase site, an output unit to display, on a display screen, a purchase list according to the designation command, and a control unit to control the output unit to display on the display screen.

In another embodiment, a method for purchasing a product using a home appliance includes receiving by a control unit, a designation command for at least one product, displaying by an output unit, a purchase list according to the designation command, and requesting by the control unit, purchase of the product in the purchase list using a connectable purchase site.

The details of one or more embodiments are set forth in the accompanying drawings and the description below. Other features will be apparent from the description and drawings, and from the claims.

BRIEF DESCRIPTION OF THE DRAWINGS

FIGS. 4A and 4B are diagrams exemplarily illustrating activation and deactivation operations of buttons illustrated in FIG. 3.

FIGS. 6A and 6B are diagrams exemplarily illustrating a popup window according to an operation performed after product selection in FIG. 5.

FIG. 8 is a diagram illustrating an exemplary display screen for describing an operation of selecting a product using a category or a frequency according to an embodiment.

FIGS. 17A to 17G are diagrams illustrating an operation of purchasing a product through the purchase site according to an embodiment.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Figure 1:
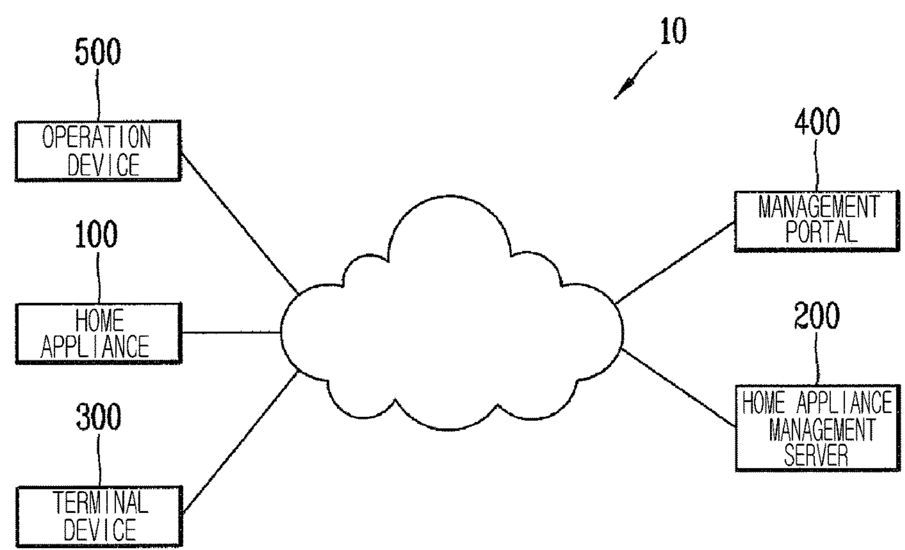
FIG. 1 is a schematic diagram illustrating a home appliance management system according to an embodiment.

FIG. 1 is a schematic diagram illustrating a home appliance management system according to an embodiment.

Referring to FIG. 1, a home appliance management system 10 according to the embodiment may include a home appliance 100 and a home appliance management server 200. The home appliance management system 10 may further include a terminal device 300, a management portal 400, and an operation device 500.

The home appliance 100 may be provided with a display screen capable of receiving input/output. The home appliance management server 200 is connected between the home appliance 100 and the external terminal device 300 through a communication network, and manages the home appliance 100 according to a management command. Here, the home appliance 100 may generate a purchase list according to a designated command for at least one product, and may display the purchase list on the display screen. Furthermore, the home appliance may display a connectable purchase site together with the purchase list, and may make a request for purchasing the product using the purchase site. In another example, the home appliance 100 may display, on the display screen, the purchase list generated according to the designated command for at least one product.

The home appliance 100 which is an object of management includes a refrigerator, a washing machine, a cooker, and etc. Although an electronic device may be a home appliance herein, another device such as a communication device may be included. The home appliance 100 may include hardware for performing a function thereof, i.e., a home appliance module, and may be a smart home appliance for enabling the home appliance module to be used in various manners.

The home appliance management server 200 performs a management service for the home appliance 100. The home appliance management server 200 includes elements for requesting execution of a management command from the home appliance 100, receiving a result of the execution of the management command from the home appliance 100, and providing the result to a user.

The management portal 400 provides a service for subscription of the user of the home appliance 100 and for supporting the user. The management portal 400 has a function of managing the user of the home appliance and a function of authenticating the home appliance. The management portal 400 may be a device, a server, or a service system operated by a manufacturer of the home appliance 100 or a seller thereof.

The operation device 500 is used to access a service provided by the management portal 400. For example, the operation device 500 may be a device provided with a network function and a user interface, such as a personal computer. Furthermore, the operation device 500 may be used to manage information on the home appliance 100 or information on the user.

The terminal device 300 is used to access the management service provided by the home appliance management server 200 for the home appliance 100. The terminal device 300 may use the management service through an application programming interface module (API) provided by the home appliance management server 200. The terminal device 300 is an arbitrary electronic device for accessing the home appliance management server 200 and using the management service for the home appliance, the management service including a device management (DM) client. For example, the terminal device 300 may include a mobile phone, a cellular phone, a smart phone, a personal digital assistant, a portable multimedia player, a tablet device, a computer, and a multimedia device.

Figure 2:
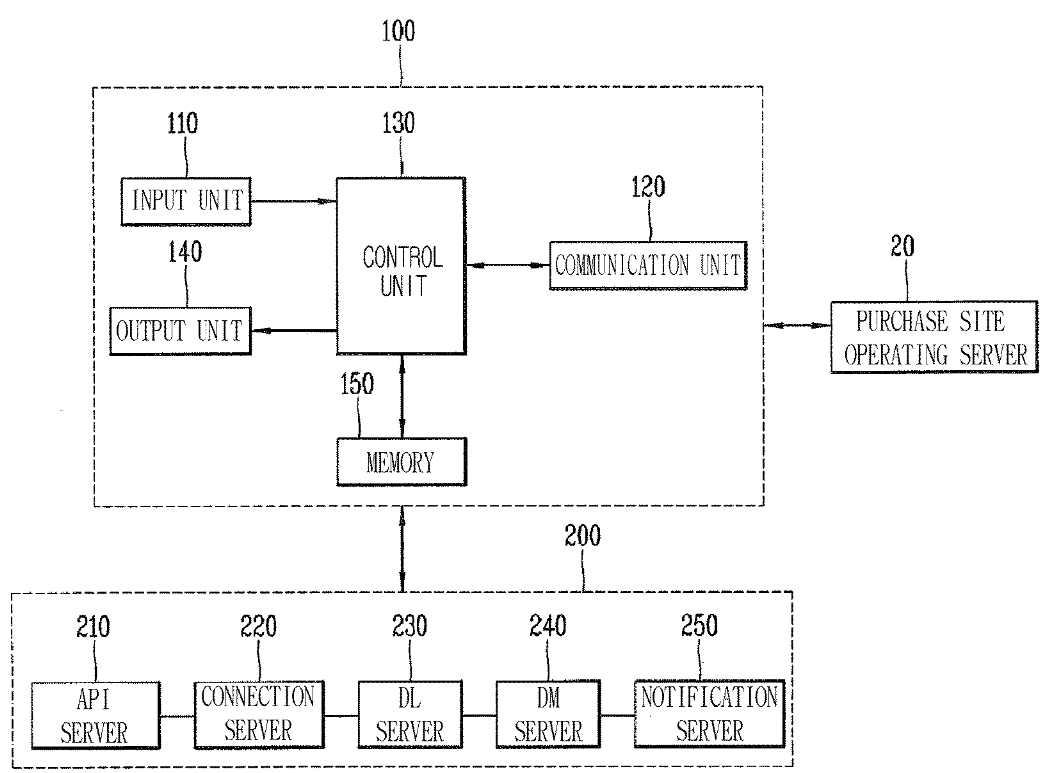
FIG. 2 is a schematic block diagram illustrating a home appliance and home appliance management server according to an embodiment.

FIG. 2 is a schematic block diagram illustrating the home appliance and the home appliance management server according to an embodiment.

Referring to FIG. 2, the home appliance 100 may include an input unit 110, a communication unit 120, a control unit 130, and an output unit 140. The home appliance 100 may further include a memory 150.

The communication unit 120 is a communication module for transmitting/receiving a control message for executing a management command, data required for executing the management command, and a result of the execution of the management command to/from the home appliance management server 200. The communication unit 120 may include a wired or wireless communication module for performing communication with the home appliance management server 200. In detail, the wireless communication module for performing communication with a device in a short range may support short range communication technologies such as Bluetooth, radio frequency identification (RFID), infrared data association (IrDA), ultra wideband (UWB), ZigBee, and wireless local area network (LAN) (protocols such as Bluetooth and 802.11n).

The input unit 110 and the output unit 140 are devices or user interfaces connected to hardware of the home appliance such as the home appliance module. The input unit 110 and the output unit 140 operate so that a control signal and state information according to a management command are transmitted/received. The home appliance performs an intrinsic function thereof such as washing, cooking, cleaning, or storing according to the control command and the management command inputted through the input unit 110. The control unit 130 may control hardware included in the home appliance using a pre-stored application program and may display a result of the control through the output unit 140, according to the commands inputted through the input unit 110.

The memory 150 may store a program for operating the control unit 130 and may temporarily store input/output data. Furthermore, the memory 150 may store various software components. In detail, the memory 150 may store an operating system (OS), applications, and a management platform. Furthermore, the memory 150 may store software components including software operating with the communication unit and software operating with the input unit and the output unit.

The memory 150 may include at least one of storage media such as a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, a flash memory type, a hard disk type, a multimedia card micro type, and a card-type memory (e.g. SD or xD memory). Furthermore, the memory 150 may have a form of a storage region for a storage function provided by a network storage or cloud service connected through the communication unit 120.

The operating system (e.g., LINUX, UNIX, OS X, WINDOWS, Chrome, Symbian, WinCE, Windows Mobile, iOS, Android, Bada, VxWorks, pSOS, and other embedded operating systems) may include various software components and/or drivers for controlling system tasks such as memory management and power management. The operating system may be changed through a process of firmware update. The firmware update is performed by a management command transmitted from the terminal device 300 to the DM client through a DM server in the home appliance management server. The management command for the firmware update may be a command for requesting performance of an upgrade function.

The application program which is executed on the operating system includes a program for an intrinsic function of the home appliance. In detail, the control unit 130 executes the application program to control the home appliance (or the home appliance module included therein).

For example, in the case where the home appliance is a washing machine in which hardware with a washing function is installed, a control signal and a state collection signal are inputted through the input unit to manage elements such as a washing drum control unit, a washing water supply unit, a sensor unit, a detergent adjusting unit, a vibration adjusting unit, and a leveling unit. In this case, the signals for managing the washing machine depend on the application program that indicates a washing method according to a washing course for designating modes, sequences, time periods, and number of times of washing, rinsing, and spin-drying according to information on laundry such as a material or fabric of the laundry.

For another example, in the case where the home appliance is a refrigerator in which hardware with a storage function is installed, a control signal and a state collection signal are inputted through the input unit to manage elements of the refrigerator such as a cooling unit, a temperature control unit, a sensor unit, and a power control unit. In this case, the signals for managing the refrigerator depend on the application program that indicates a storage method according to a storage mode, a ripening mode, or a preserving mode.

The application program may be changed through a software update process. The software update process may be performed by a management command transmitted from the terminal device 300 to the DM client through the DM server. The management command for the software update may be a command for requesting performance of an upgrade function.

A management platform is a management program executed on the operating system and may include the DM client. The DM client transmits/receives a management message for managing the home appliance to/from the DM server in the home appliance management server. Management functions performed by the DM client are for managing the home appliance module installed in the home appliance and include, for example, monitoring, diagnosis, upgrade, and remote control.

The management platform may include a DM daemon. The DM daemon may receive, for the DM client, a notification message transmitted through a notification server in the home appliance. Furthermore, the DM daemon may perform a function of processing an exception of the DM client.

The management platform may include a service agent. The service agent is used for the DM client to control hardware included in the home appliance according to the management command or for the control unit to control the hardware by executing the application program.

The control unit 130 controls elements of the home appliance. That is, the control unit 130 controls the input unit 110, the communication unit 120, the output unit 140, the memory 150, and hardware. The control unit 130 may execute the software components stored in the memory 150. The control unit 130 may control the home appliance module according to the application program. Furthermore, the control unit 130 may execute or update the application program to execute the management command received from the home appliance management server 200.

Referring to FIG. 2, the home appliance management server 200 includes at least one of an API server 210, a connection server 220, a download (DL) server 230, a DM server 240, and a notification server 250.

The API server 210 is an interface module for providing a device management service to an external terminal or application program of the home appliance management server 200. In detail, the API module 210 may have at least one of an interface function for authentication for identifying whether a terminal or an application program attempting to access the device management service is authorized, an interface function for a remote diagnosis of the home appliance 100, an interface function for monitoring the home appliance 100, an interface function for controlling the application program of the home appliance 100, and an interface function for controlling the home appliance module of the home appliance 100.

The connection server 220 may perform a message transferring function for transferring, to the home appliance 100, a management command request message transmitted from the external terminal of the home appliance management server 200, and for transferring, to the home appliance management server 200, a result of performing the management command according to the management command request message from the home appliance 100.

The DL server 230 may perform a function of transmitting download data to the home appliance 100. The DL server 230 may be a module for transmitting the download data according to a download standard of the OMA.

The DM server 240 may request execution of the management command by transmitting/receiving a control message to/from the DM client that performs a function related to management of devices in the home appliance 100, and may receive a result of the management command. The DL server 240 may transmit/receive messages for the management command according to a DM standard of the OMA.

The notification server 250 may perform a notification function for transmitting/receiving a notification message for device management to/from the home appliance 100. The notification server 250 may exchange messages between the home appliance 100 and the DM server 240 in a push scheme.

Although FIG. 2 illustrates that the home appliance management server 200 includes five servers, the home appliance management server may be configured in a single device. In this case, the home appliance management server may include a communication unit, a storage unit, and a control unit.

The communication unit performs communication with the home appliance 100 and the terminal device 300.

The storage unit may store a program for operating the control unit, and may temporarily store input/output data. In detail, the storage unit may store program for transferring, to the home appliance 100, a request for execution of the management command received from the terminal device and for receiving, from the home appliance 100, a result of the management command. In more detail, the storage unit may include at least one of an API program, a connection program, a download program, a device management program, and a notification program.

The control unit controls elements of the home appliance management server 200. That is, the control unit controls the communication unit and the storage unit. The control unit may execute the programs stored in the storage unit.

Figure 18:
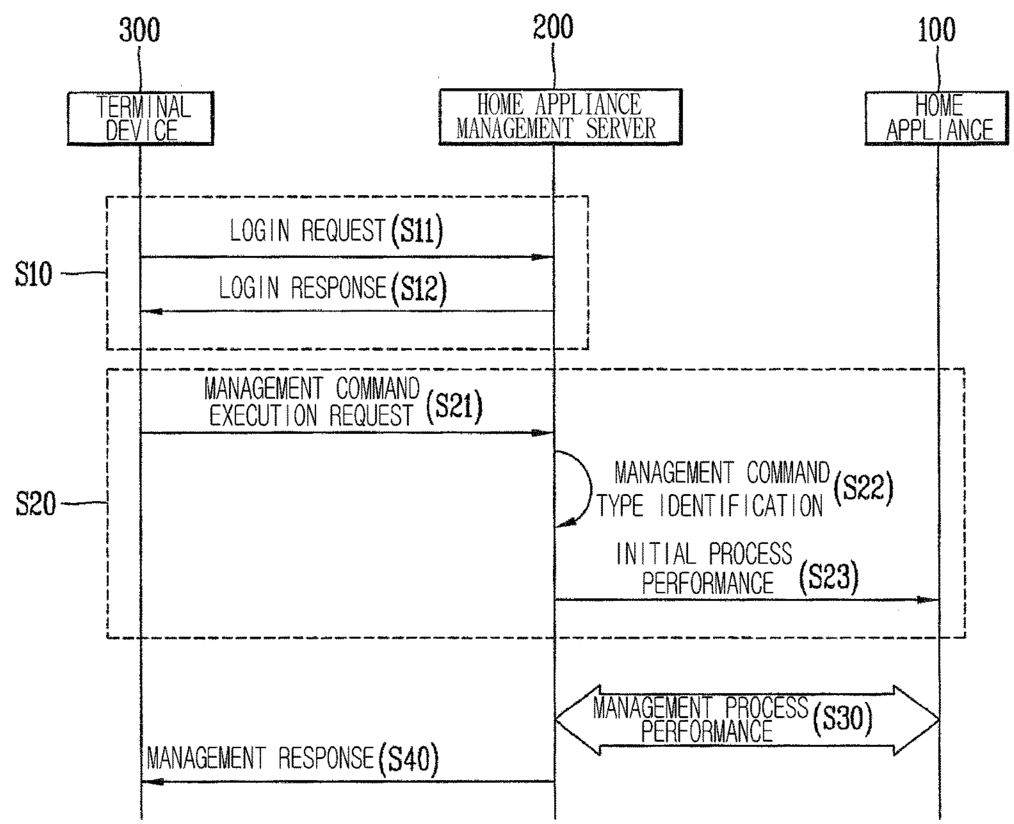
FIG. 18 is a flowchart illustrating a method of transferring, by an external terminal device, a management command to the home appliance through the home appliance management server and receiving a result of execution of the management command according to an embodiment.

Hereinafter, a home appliance managing method of a home appliance management system according to an embodiment will be described with reference to FIG. 18. FIG. 18 illustrates a method of transferring, by the terminal device, the management command to the home appliance through the home appliance management server and receiving a result of the management command.

The terminal device 300 transmits a management command request signal to the home appliance management server 200 according to input from the user. The home appliance management server 200 which has received the request signal identifies a type of the management command included in the request signal and determines a method of applying the management command according to a result of the identification. The home appliance management server 200 instructs the home appliance 100 to execute the management command according to the determined applied method. Furthermore, if necessary, the home appliance management server 200 transmits a result of the execution of the management command to the terminal device 300.

The home appliance management server 200 examines whether the terminal device 300 is a proper device for requesting the management command for the home appliance 100 (operation S10). In detail, the terminal device 300 transmits a login request message to the home appliance management server 200 (operation S11).

The login request message may include information for authenticating the terminal device 300 or an application program for device management performed in the terminal device 300. The home appliance management server 200 may provide an API-type interface so that an application program executed in an external device executes the management command for the home appliance. The home appliance management server 200 authenticates an application, a device, or the user calling the interface, so that an allowed application program or device calls the interface. The login request message may be an authentication message used to notify that the interface is available for use by the home appliance 100.

The home appliance management server 200 examines the authentication information included in the login request message and transmits a result of the examination. When it is confirmed that the terminal device 300 or the application program for device management performed in the terminal device 300 is allowed to request the management command from the home appliance management server 200, a login response message is transmitted to the terminal device 300 (operation S12).

The login response message may include access information required for the terminal device 300 to request execution of the management command.

The access information may be information for accessing the management server 200 for receiving a request for a real-time management command. For example, the access information may be an IP address or a Transmission Control Protocol (TCP) port number of the home appliance management server 200.

Next, the terminal device 300 requests a management command from the home appliance management server 200, the home appliance management server 200 identifies a type of the management command and requests initialization for performing a management process from the home appliance 100 according to a result of the identification (operation S20). Alternatively, the home appliance management server 200 may be configured to operate regardless of the type of the management command.

In detail, the terminal device 300 accesses the home appliance management server 200 to request execution of the management command (operation S21). Thereafter, the management server 200 identifies the type of the management command (operation S22).

The type of the management command may be divided according a method for transmitting/receiving a control message for executing the management command between the management server 200 and the home appliance 100. For example, a first type of the management command indicates a method of requesting the execution of the management command and transmitting the result of the execution by transmitting/receiving a control message according to the DM standard of the OMA. According to the transmitting/receiving method according to the DM standard of the OMA, a connection between the management server 200 and the home appliance is repeatedly established and released in order to transmit/receive a plurality of messages for the management command. Therefore, the first type may correspond to a non-realtime management command executed not in real time.

A second type of the management command indicates a relay method through a connection-oriented session, i.e., a method of requesting the execution of the management command and transmitting the result of the execution by transmitting a plurality of data packets through a connection between the home appliance management server 200 and the home appliance 100 which is continuously maintained. The second type may correspond to a realtime management command.

It may be determined whether the management command has the realtime characteristic on the basis of whether the management command is required to be executed within a predetermined time after the home appliance management server 200 or the home appliance 100 receives the management command. Furthermore, the home appliance management server 200 may identify the type of the management command on the basis of a type of the API used to request the execution of the management command. For another example, the home appliance management server 200 may identify the type of the management command on the basis of a characteristic of a connection to the terminal device 300 established to request the management command.

Thereafter, the home appliance management server 200 performs an initial process for transferring the management command to the home appliance 100 according to a result of the identifying the type of the management command (operation S23).

Thereafter, the home appliance management server 200 requests the home appliance 100 to execute the management command, and transmits/receives a control message for receiving a result of the execution, thereby performing a management process according to the management command (operation S30). A method of transmitting/receiving the control message for device management during the management process may be differently configured according to the type of the management command.

Thereafter, if necessary, the home appliance management server 200 transmits a result of the performing the management process to the terminal device 300 (operation S40).

Hereinafter, the home appliance, a product purchasing method using the home appliance, and the home appliance management system according to embodiments will be described in detail with reference to FIGS. 2 to 20.

The input unit 110 is provided at one side of a main body of the home appliance, and receives a designation command for at least one product. The communication unit 120 may directly or indirectly communicate with a server related to a purchase site, i.e., a purchase site operating server 20. The output unit 140 may display a purchase list according to the designation command. The control unit 130 may control the output unit 140.

Firstly, a process of purchasing a product will be described with reference to FIGS. 3 to 17C illustrating changes in a screen of a display provided to the home appliance. Here, the display screens are merely examples. As illustrated in FIGS. 3 to 17G, the home appliance is a refrigerator, and the product may be food.

Figure 3:
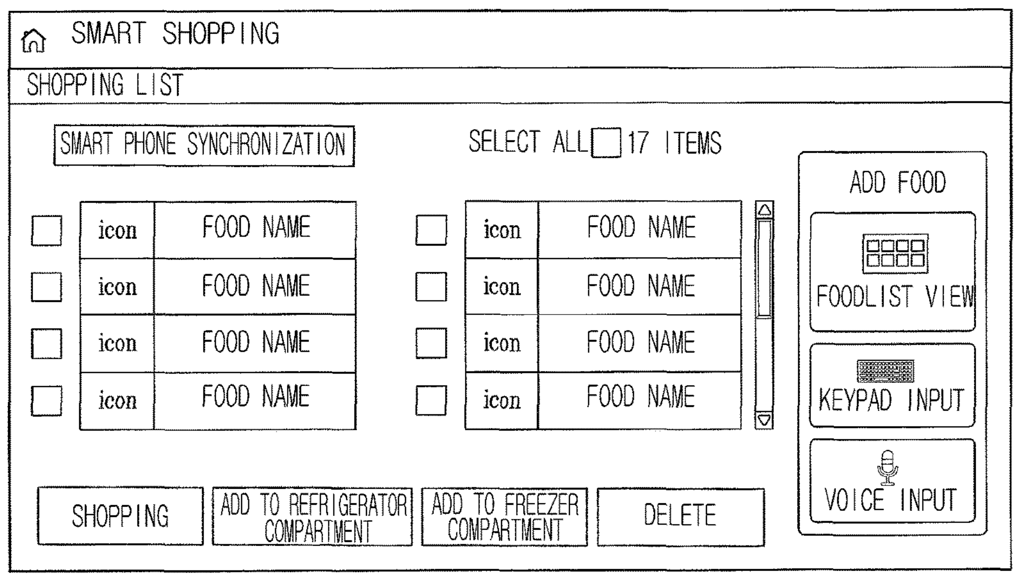
FIG. 3 is a diagram illustrating an exemplary main screen displayed on a display of the home appliance according to an embodiment.

FIG. 3 is a diagram illustrating an exemplary main screen displayed on the display of the home appliance.

The number of all products included in the purchase list may be displayed on the display, and a select-all checkbox may be displayed to select all products at once. The purchase list may be displayed on a part of the display screen, and may be displayed so as to be scrolled when the number of the products is not less than a certain number. One or more buttons for performing specific functions may be displayed on the display, and may be displayed so as to add or delete a product. In the present embodiment, the purchase list displayed on the display is a list of products selected to be purchased according to an automatic or manual designation command. The purchase list may be the same as or different from a list of products that will be actually purchased.

As illustrated in FIG. 3, the display displays the select-all checkbox and displays that the number of foods included in the purchase list is 17. Basically, 'shopping', 'add to refrigerator compartment', 'add to freezer compartment', and 'delete' buttons may be displayed on the main screen. An icon or an image may be displayed with a food name on the purchase list. Checkboxes are displayed to partially select the foods in the purchase list.

A food addition region is formed on a part of the main screen. Food addition, i.e., the designation command for a product to be purchased, may be performed, for example, by at least one of touch input, keypad input, and voice input to the display screen. A button for the designation command may be provided to the food addition region. When the user taps on a keypad input button, the display allows for manipulation to a keypad screen for inputting a food name. When the user taps on a voice input button, the display allows for voice activation through a voice recognition pop-up window.

The communication unit 120 may be connected to an external terminal device, may transmit the purchase list to the terminal device, and may receive a pre-generated purchase list from the terminal device. To this end, the display may further display a 'smart phone synchronization' button in the case where the terminal device is a smart phone.

FIGS. 4A and 4B are diagrams exemplarily illustrating activation and deactivation operations of the buttons illustrated in FIG. 3. The activation or deactivation of the buttons may be changed according to a program.

That is, as illustrated in FIG. 4A, when there is no selected food item or when there is no stored food in the purchase list (shopping list), only the shopping button is activated and the other buttons are deactivated. On the contrary, referring to FIG. 4B, when there is a selected food item, all operable buttons are activated.

Figure 5:
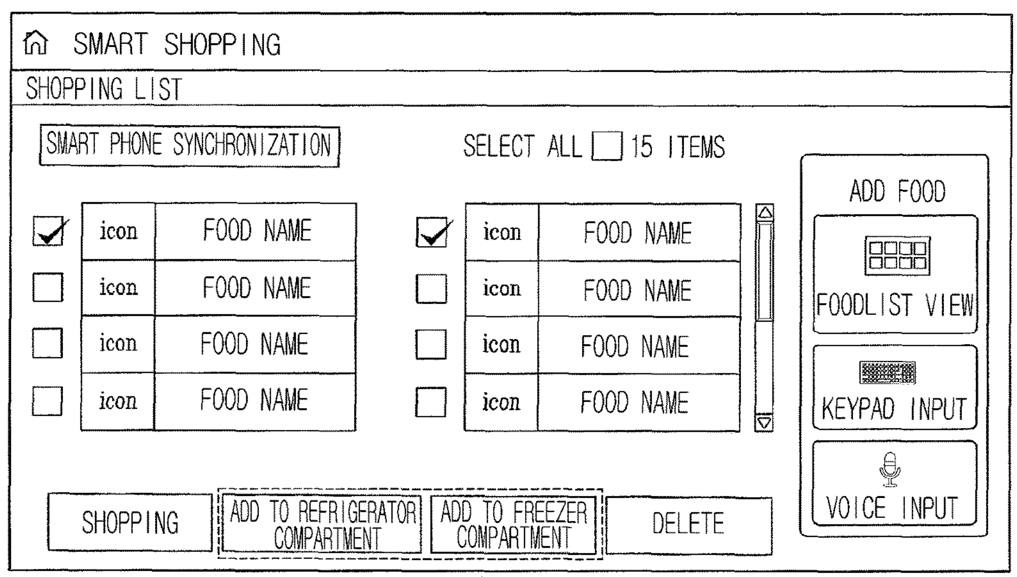
FIG. 5 is a diagram illustrating an exemplary display screen for describing an operation of generating a purchase list according to an embodiment.

FIG. 5 is a diagram illustrating an exemplary display screen for describing an operation of generating the purchase list. When the user selects at least one food from among the foods included in the purchase list, i.e., when the user checks a checkbox corresponding to a food name, operable buttons such as the 'shopping', 'add to refrigerator compartment', 'add to freezer compartment' buttons are activated, as illustrated in FIG. 4B.

Figures 6A, 6B:
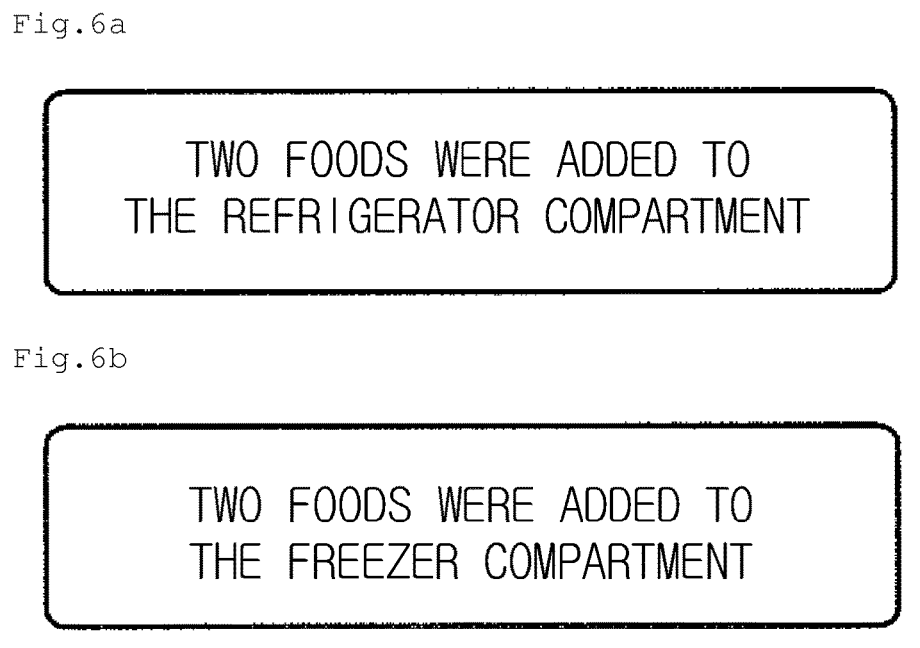

For example, when the user selects two foods from among the foods included in the purchase list and then taps on the 'add to refrigerator compartment' button, a message window notifying 'two foods were added to the refrigerator compartment' may pop up on the screen, as illustrated in FIG. 6A. Furthermore, when the user selects two foods from among the foods included in the purchase list and then taps on the 'add to freezer compartment' button, a message window notifying 'two foods were added to the freezer compartment' may pop up on the screen, as illustrated in FIG. 6B.

Figure 14A:
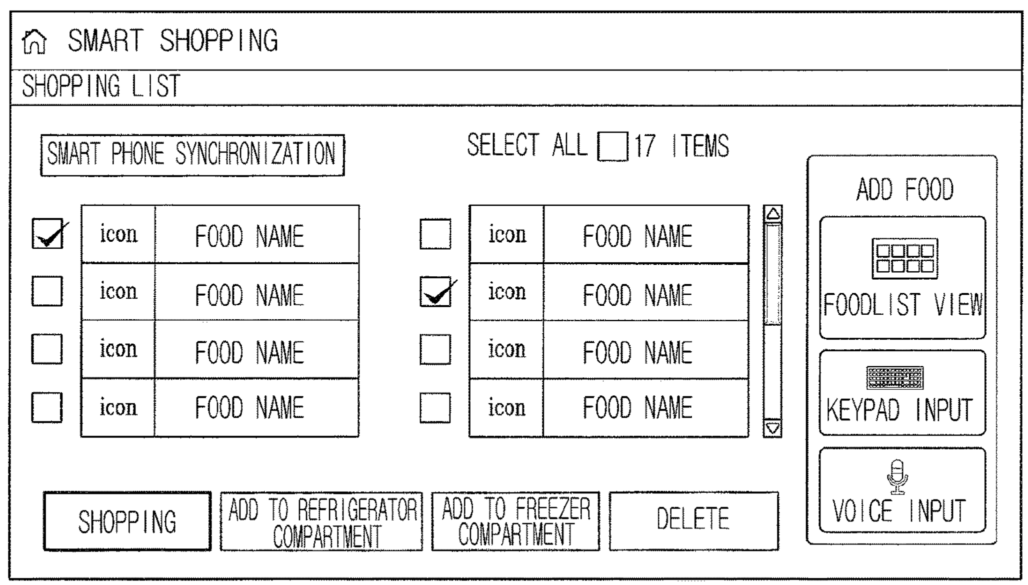
FIGS. 14A to 14C are diagrams illustrating an operation of adding a product in the purchase list to a refrigerator according to an embodiment.
Figure 14B:
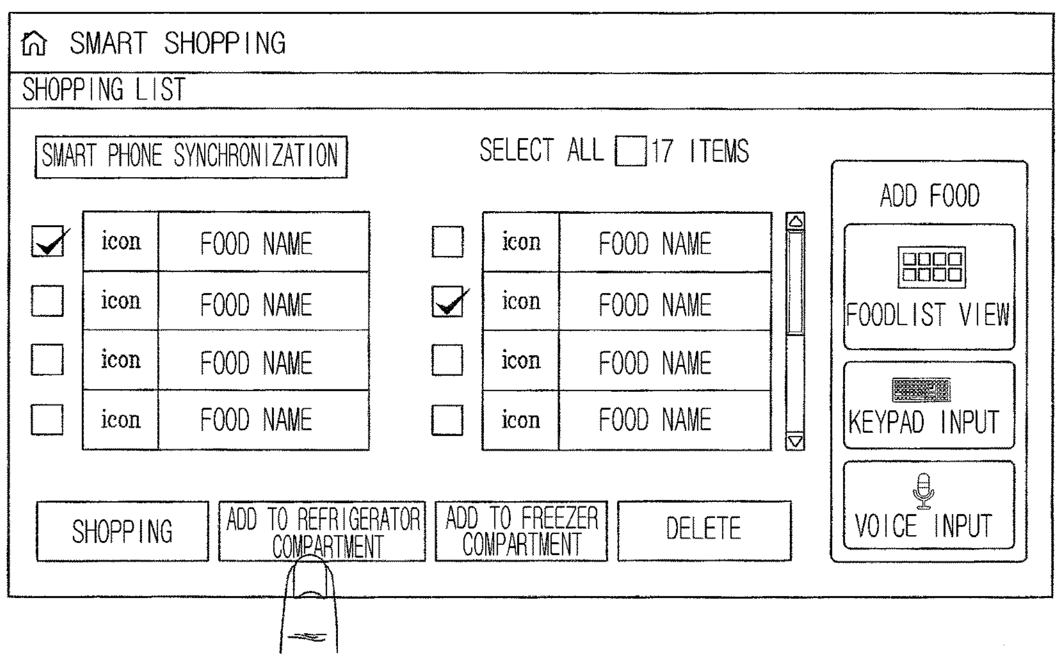
Figure 14C:
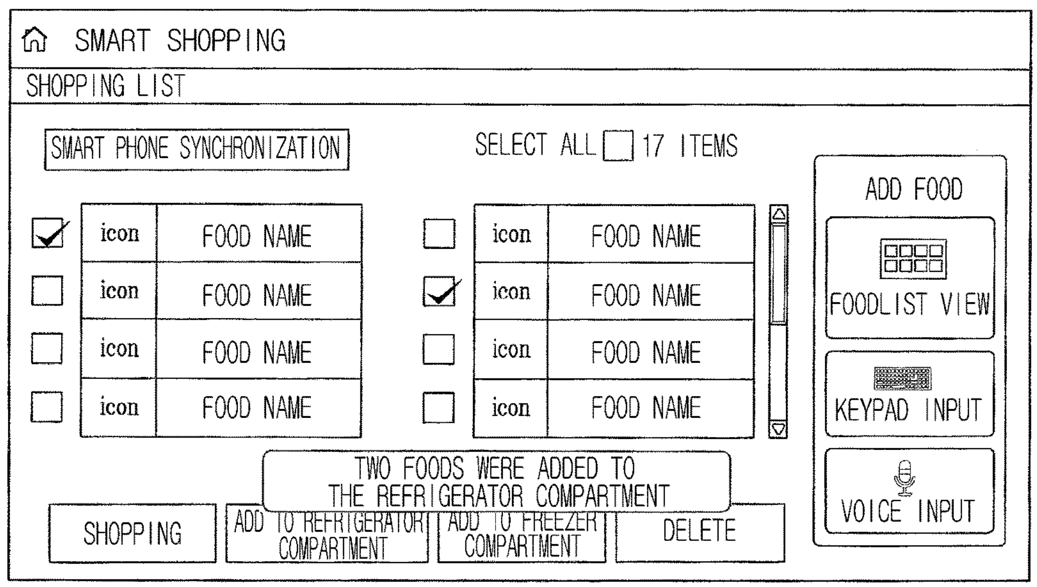

An operation of adding a product in the purchase list to the refrigerator will be described with reference to FIGS. 14A to 14C. When the user selects two foods from among the foods included in the purchase list as illustrated in FIG. 14A and then taps on the 'add to refrigerator compartment' button as illustrated in FIG. 14B, a message window notifying 'two foods were added to the refrigerator compartment' may pop up on the screen, as illustrated in FIG. 14C.

Figure 7:
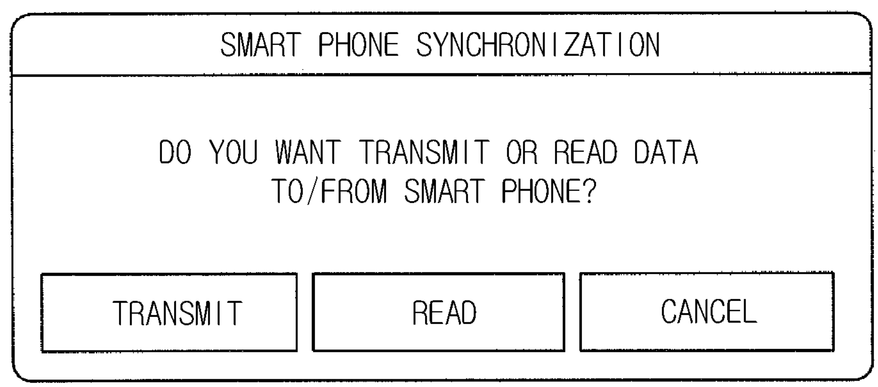
FIG. 7 is a diagram illustrating an exemplary display screen for describing a synchronization operation between the home appliance and an external terminal device according to an embodiment.

FIG. 7 is a diagram illustrating an exemplary display screen for describing a synchronization operation between the home appliance and the external terminal device. A 'smart phone synchronization' button is displayed on the display, and a guide message window pops up when the user taps on the button. As illustrated in FIG. 7, a message saying 'do you want to transmit or read data to or from smart phone?' may be displayed on the message window.

Figure 13A:
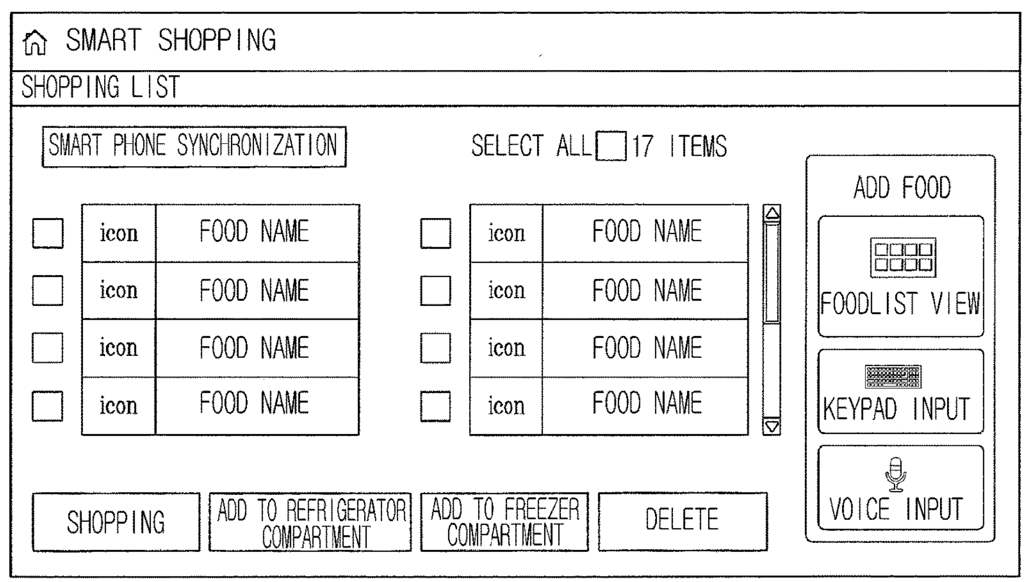
FIGS. 13A to 13D are diagrams exemplarily illustrating an operation of transmitting/receiving the purchase list in synchronization with the external terminal device according to an embodiment.
Figure 13B:
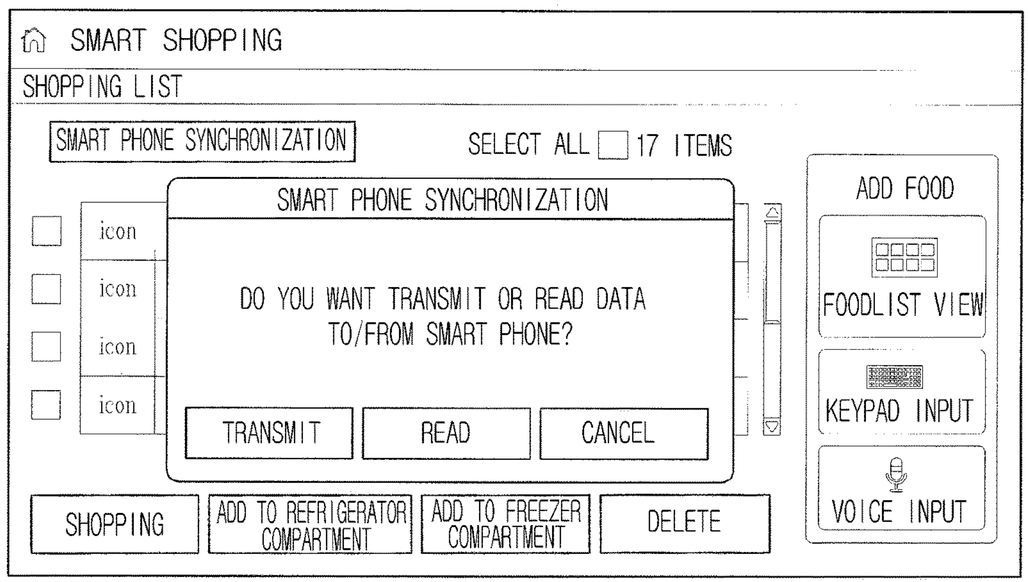
Figure 13C:
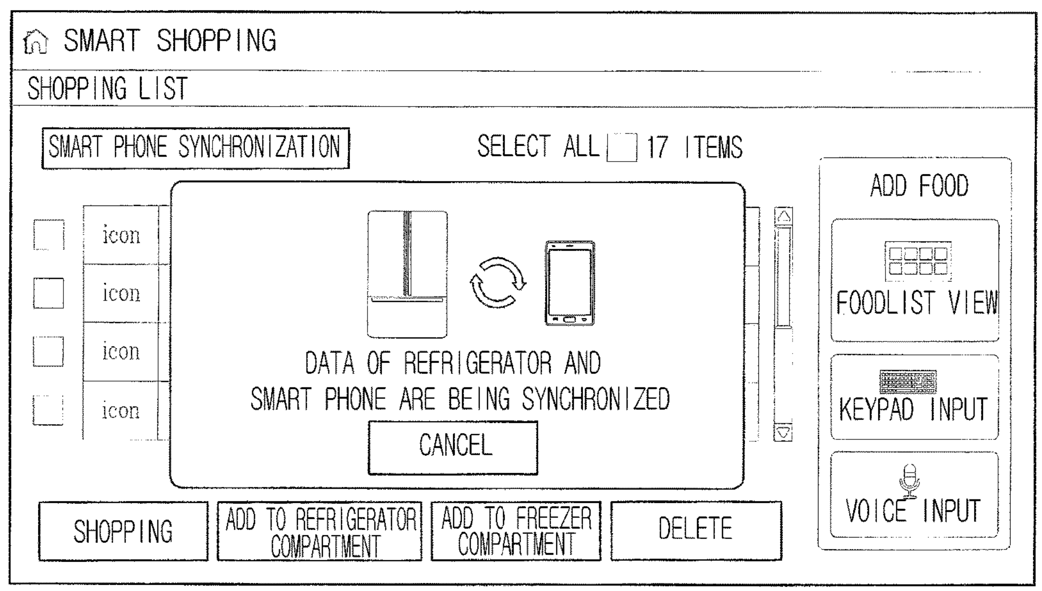
Figure 13D:
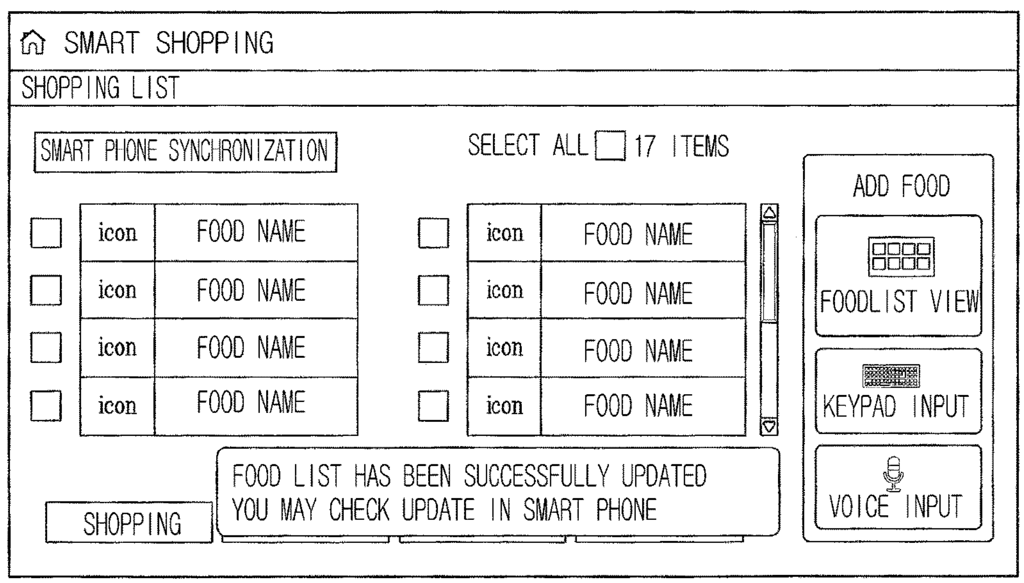

FIGS. 13A to 13D are diagrams exemplarily illustrating an operation of transmitting/receiving the purchase list in synchronization with the external terminal device. When the user taps on the 'smart phone synchronization' button on the display screen illustrated in FIG. 13A, the output unit 140 allows a message window to pop up on the display screen as illustrated in FIG. 13B. As illustrated in FIG. 13C, when the user presses a 'transmit' button, a message window saying 'data of refrigerator and smart phone are being synchronized' pops up on the display and the purchase list generated in the refrigerator is transmitted to the smart phone. When the transmission of the purchase list is normally completed, the display displays a confirmation message as illustrated in FIG. 13D.

Figure 8:
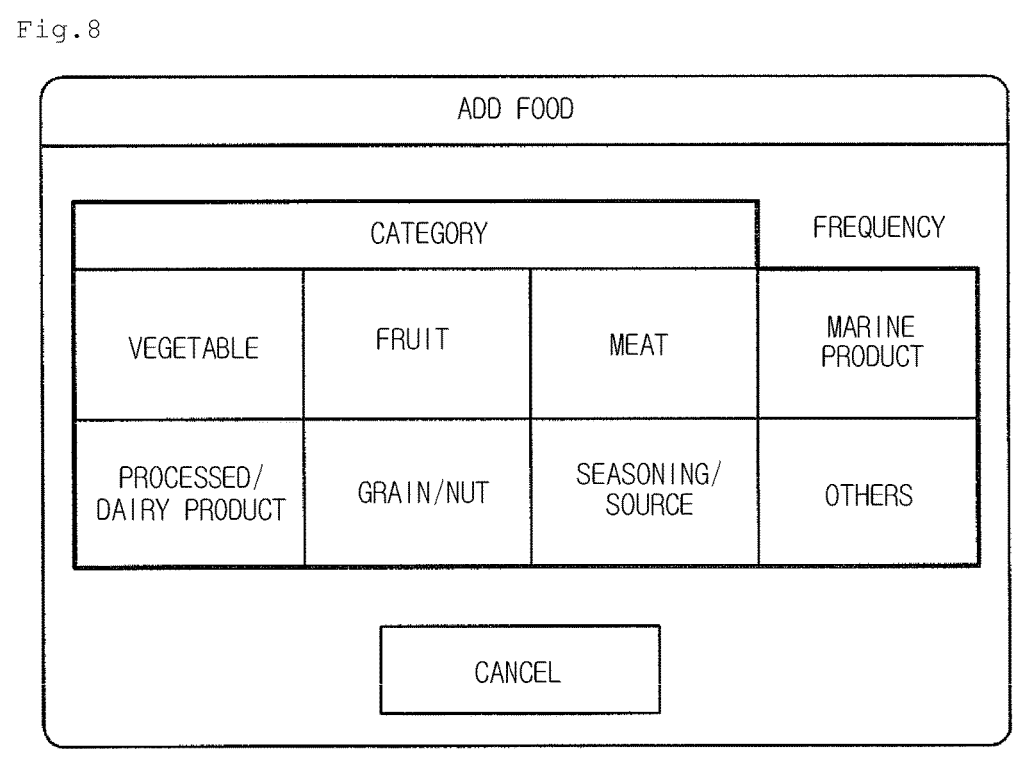

Purchasable products may be categorized and stored in the memory 150. The memory 150 may further store a designation frequency or a purchase frequency for each of the products. FIG. 8 is a diagram illustrating an exemplary display screen for describing an operation of selecting a product using a category or a frequency. For example, when the user taps on a 'food list view' button displayed on the main screen, a list of selectable foods is displayed as illustrated in FIG. 8. That is, according to a simple touch input by the user, the designation command for food may be inputted.

Figure 9:
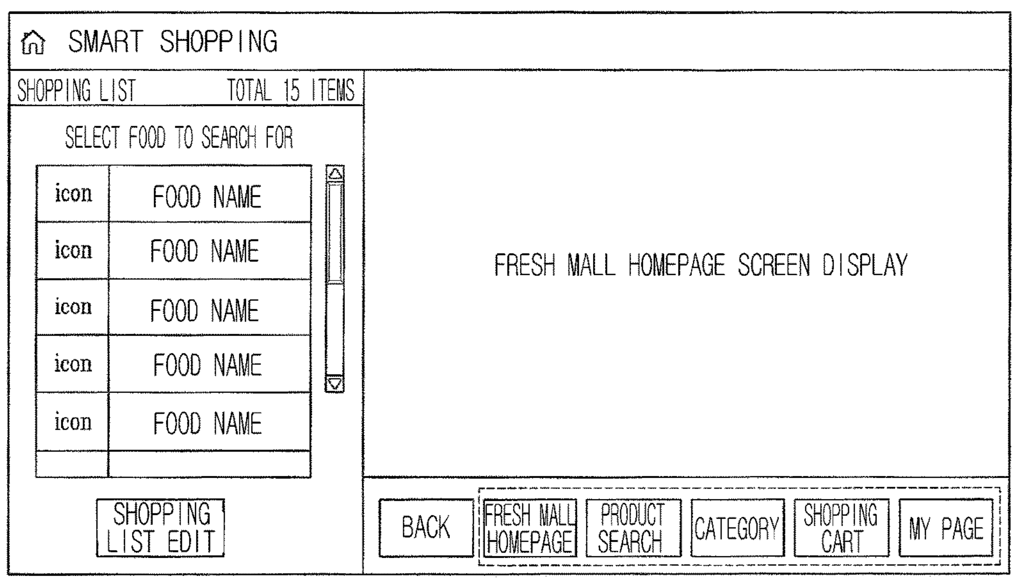
FIG. 9 is a diagram illustrating an exemplary display screen on which both a purchase list and a purchase site are displayed according to an embodiment.

The display screen may be divided into two or more regions. The output unit 140 may display the purchase list on a first region and display the purchase site on a second region at the same time. FIG. 9 is a diagram illustrating an exemplary display screen on which both the purchase list and the purchase site are displayed. The total number of foods included in the purchase list may be displayed on the first region. The display may display a food name together with an icon or an image. The display may further display a button for editing the purchase list (shopping list). When the purchase list is empty, a guide message saying 'purchase list is empty' may be displayed on the first region. Here, a 'shopping list edit' button may be activated. A screen of the purchase site, i.e., a connectable shopping site (fresh mall homepage), is displayed on the second region. Furthermore, the display may display a button so that a function is performed in relation to the displayed purchase site. For example, the display may display 'back', 'fresh mall homepage', 'product search', 'category', 'shopping cart', and 'my page' buttons related to the purchase site. Initially, the 'back' button may be deactivated.

Figure 10:
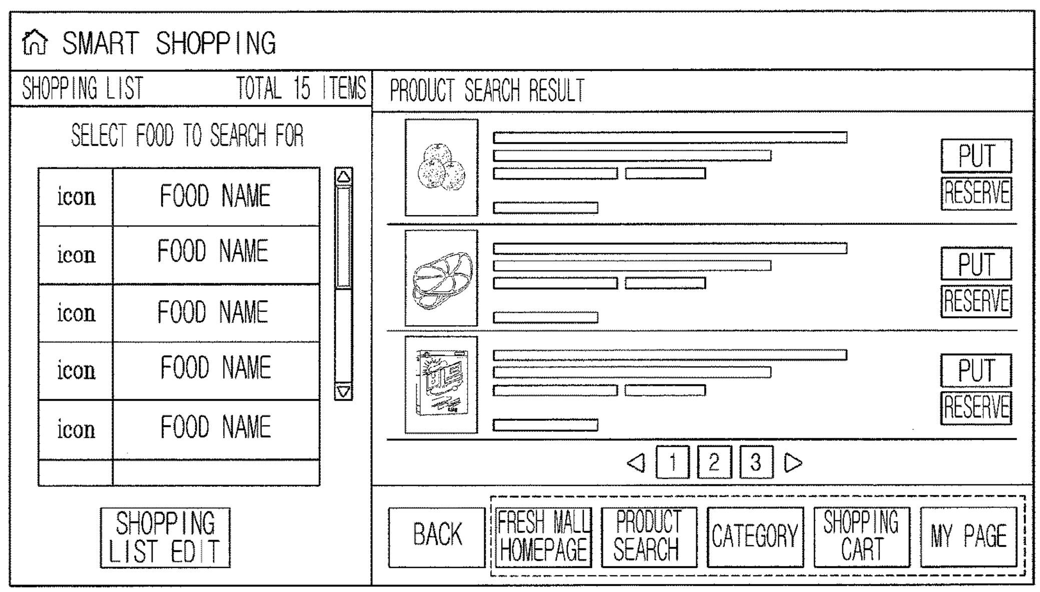
FIG. 10 is a diagram illustrating an exemplary display screen on which a result of searching the purchase site for the products in the purchase list is displayed according to an embodiment.

The output unit 140 may display a result of search for at least one object product on the second region. FIG. 10 is a diagram illustrating an exemplary display screen on which a result of searching the purchase site for the products in the purchase list is displayed. Referring to FIG. 10, when the user selects a food name or an icon in the purchase list, a result of search for the selected food is displayed on the region where the purchase site is displayed, i.e., the second region. The search result includes, for example, price information on at least one product.

Figure 16A:
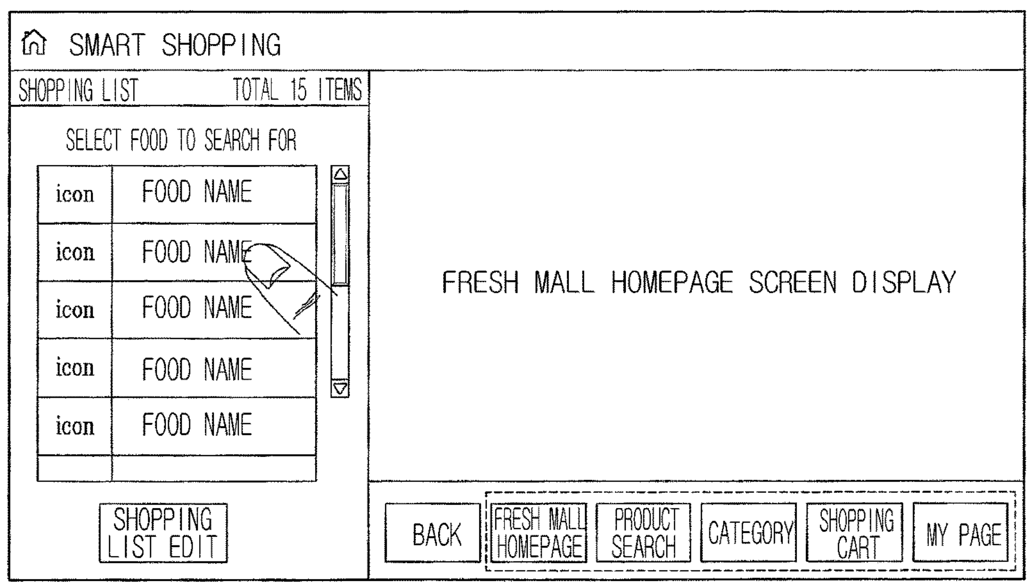
FIGS. 16A to 16D are diagrams illustrating an operation of providing detailed information on the products in the purchase list through the purchase site according to an embodiment.
Figure 16B:
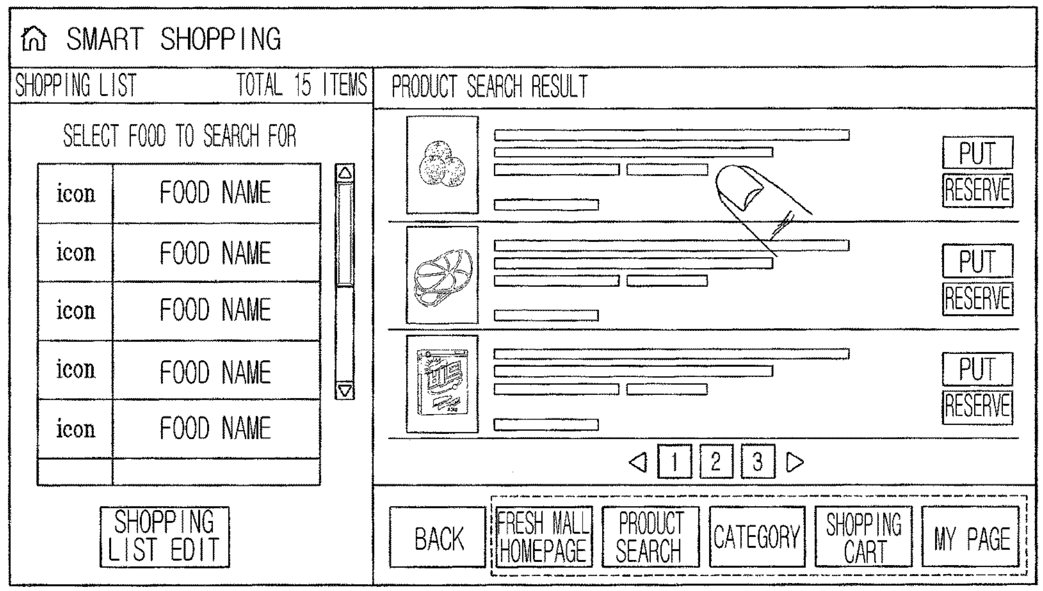
Figure 16C:
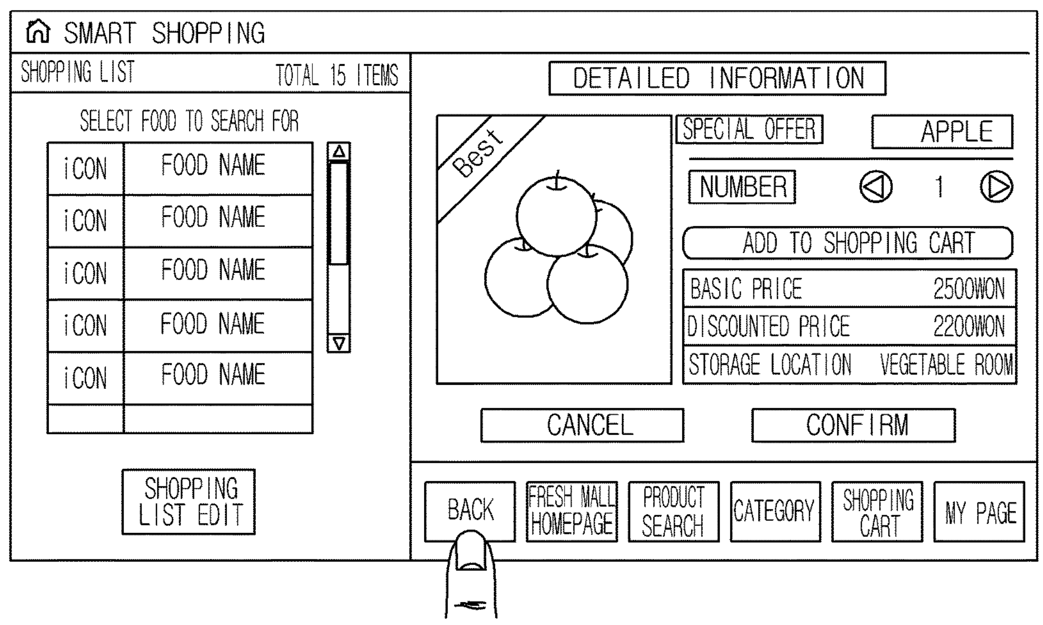
Figure 16D:
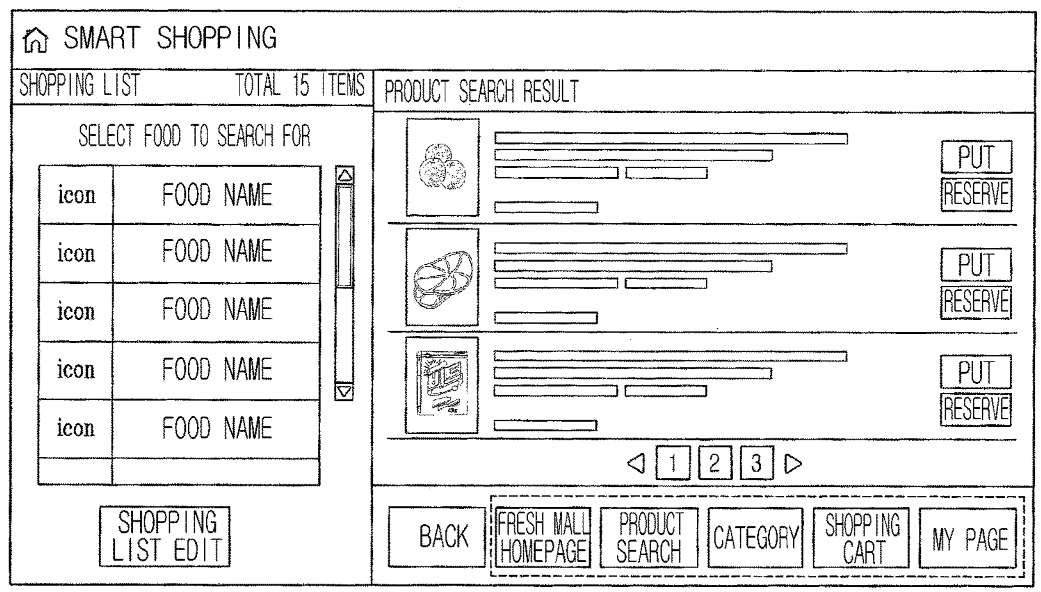

Referring to FIGS. 16A to 16D, detailed information on the products in the purchase list may be provided through the purchase site. That is, the detailed information on the products in the purchase list displayed on the first region may be displayed on the second region where the purchase site is displayed. When the user selects a food name or an icon on the display screen on which the purchase list and the purchase site are displayed as illustrated in FIG. 16A, a search result is displayed on the second region as illustrated in FIG. 16B. When the user selects a single item from the search result displayed on the display screen, detailed food information screen is displayed on the second region as illustrated in FIG. 16C. For example, at least one of a product name, an actual price, a discounted price, and a requested storage location may be displayed on the detailed food information screen. Here, if the 'back' button is tapped, the search result screen is displayed as illustrated in FIG. 16D, which is the screen illustrated in FIG. 16B.

Figure 11A:
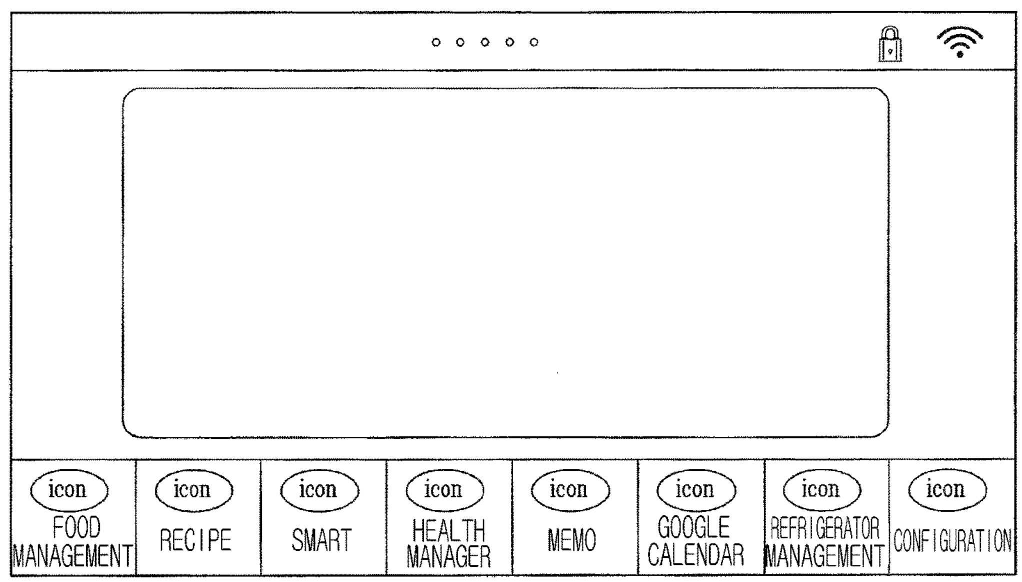
FIGS. 11A to 11F are diagrams illustrating an operation of generating the purchase list by touching the display screen according to an embodiment.
Figure 11B:
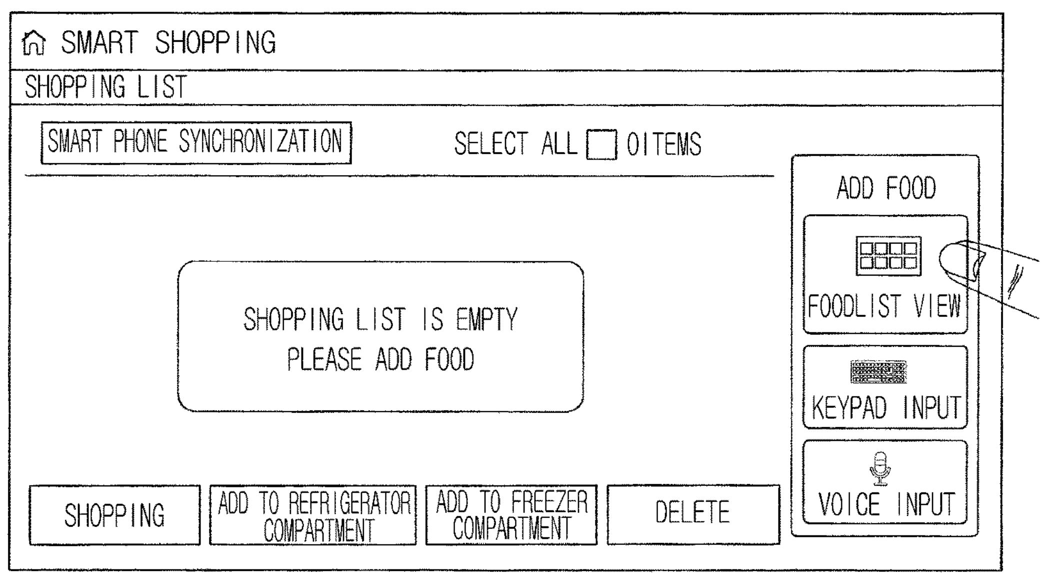
Figure 11C:
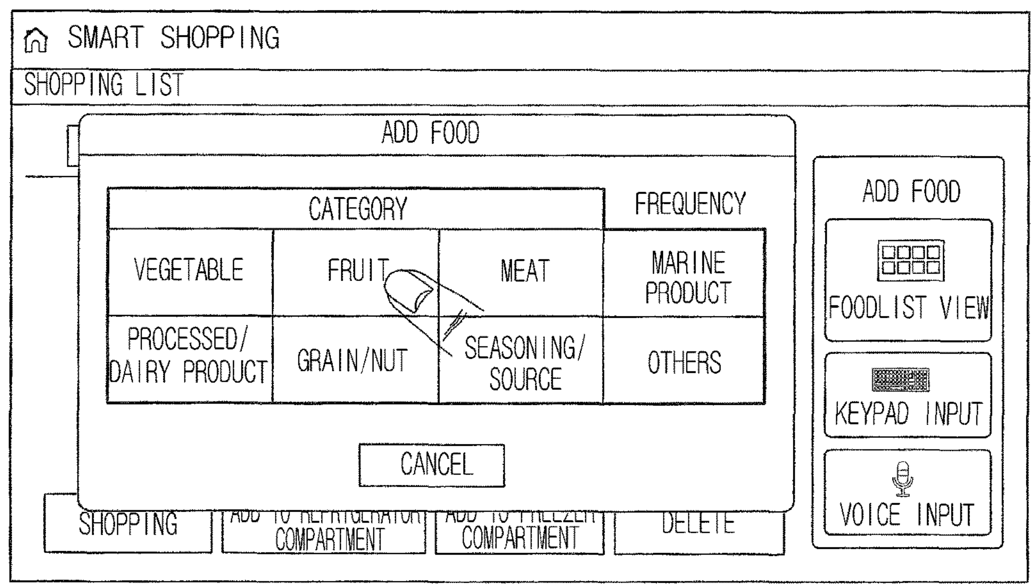
Figure 11D:
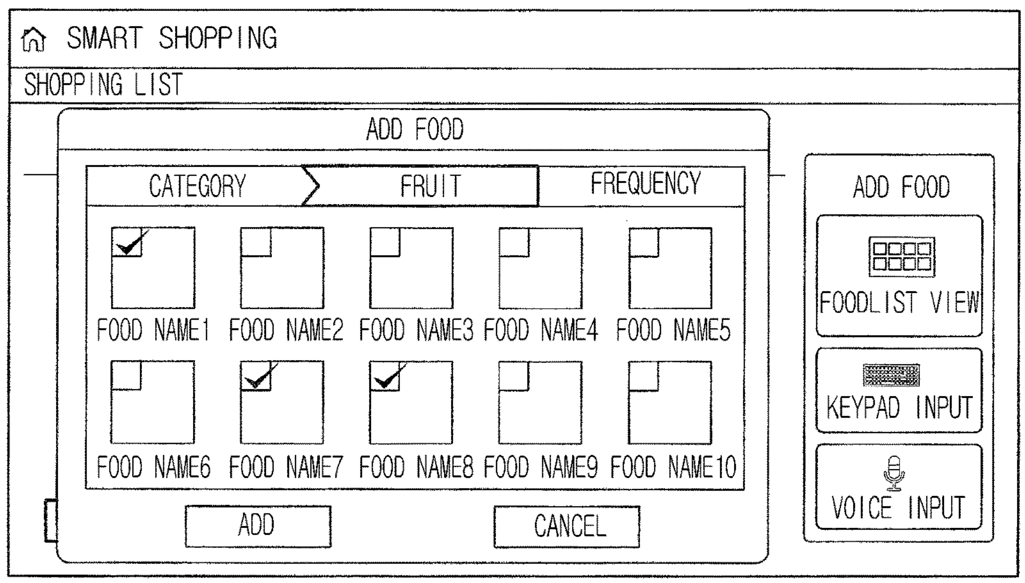
Figure 11E:
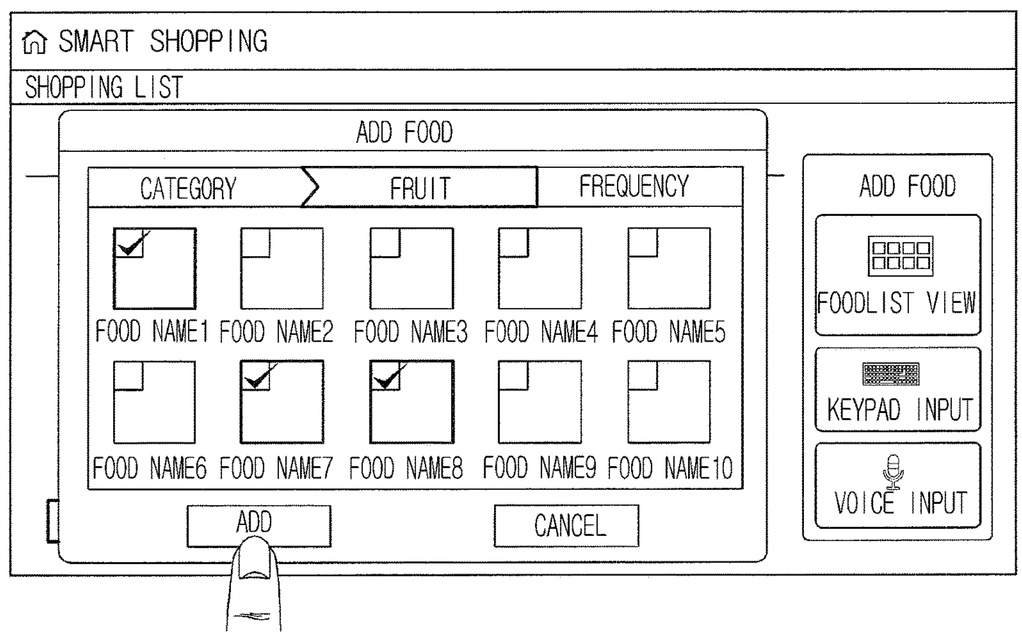
Figure 11F:
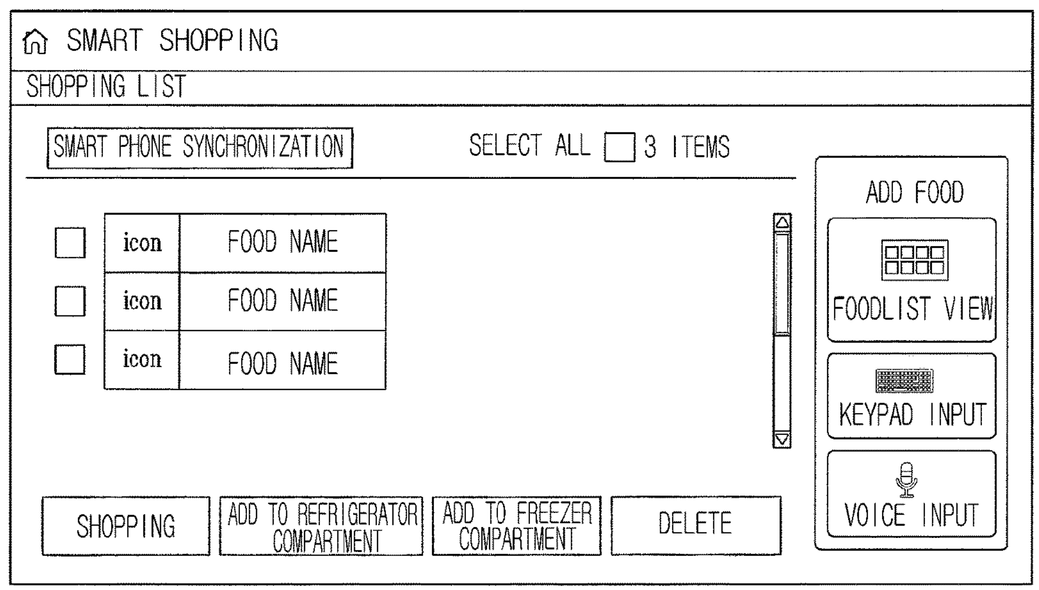

An operation of generating the purchase list by touching the display screen will be described with reference to FIGS. 11A to 11F. FIG. 11A is a diagram illustrating a refrigerator management main (initial) screen. Various management menus and a so-called smart shopping button may be provided to the main screen. When the user presses a 'smart' button, the output unit 140 displays the main screen on the display as illustrated in FIG. 11B. When the user taps on one of the buttons of the food addition region, for example, the 'food list view' button, a food addition screen is displayed on the display as illustrated in FIG. 11C. That is, when the user taps on the 'food list view' button displayed on the main screen, a list of selectable foods is displayed as illustrated in FIG. 11C. That is, according to a simple touch input by the user, the designation command for food may be inputted. As illustrated in FIG. 11D, the user may select a category and then may select at least one of foods in the category. When the user presses an 'add' button after selecting foods as illustrated in FIG. 11E, the purchase list including the selected foods is generated as illustrated in FIG. 11F. Alternatively, when a storage amount of a specific food is not greater than a reference amount, the control unit 130 adds the food to the purchase list. Here, the storage amount may be expressed in weight or number.

Figure 12A:
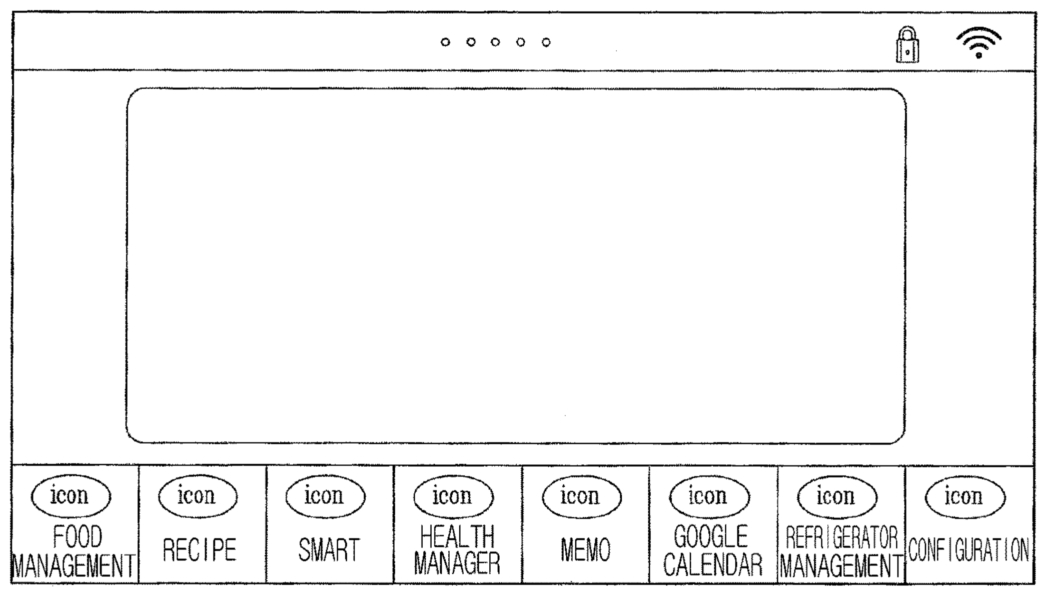
FIGS. 12A to 12C are diagrams exemplarily illustrating an operation of connection to the purchase site when the purchase list is empty according to an embodiment.
Figure 12B:
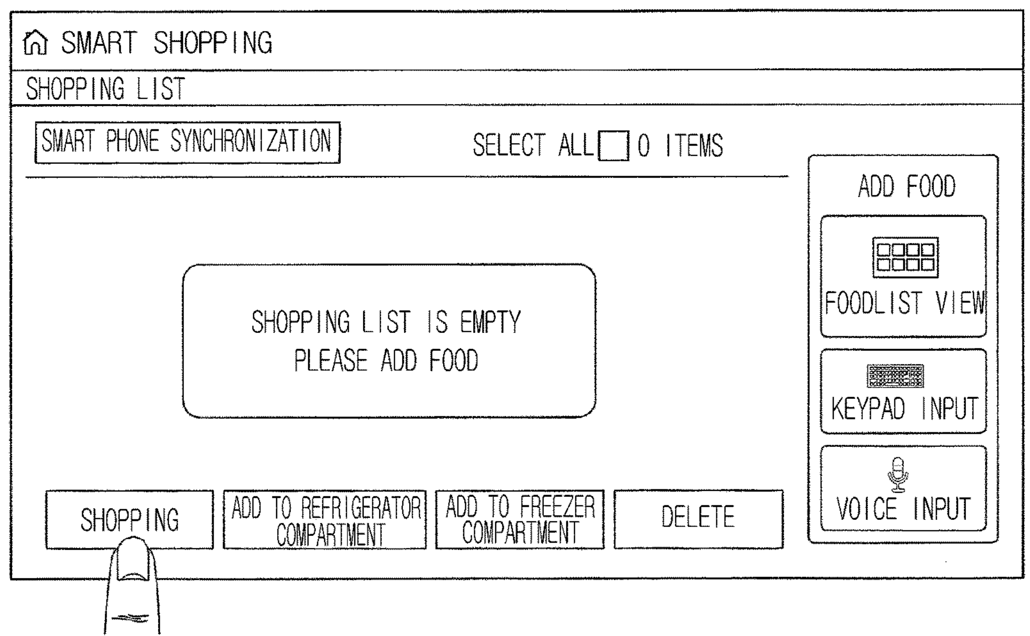
Figure 12C:
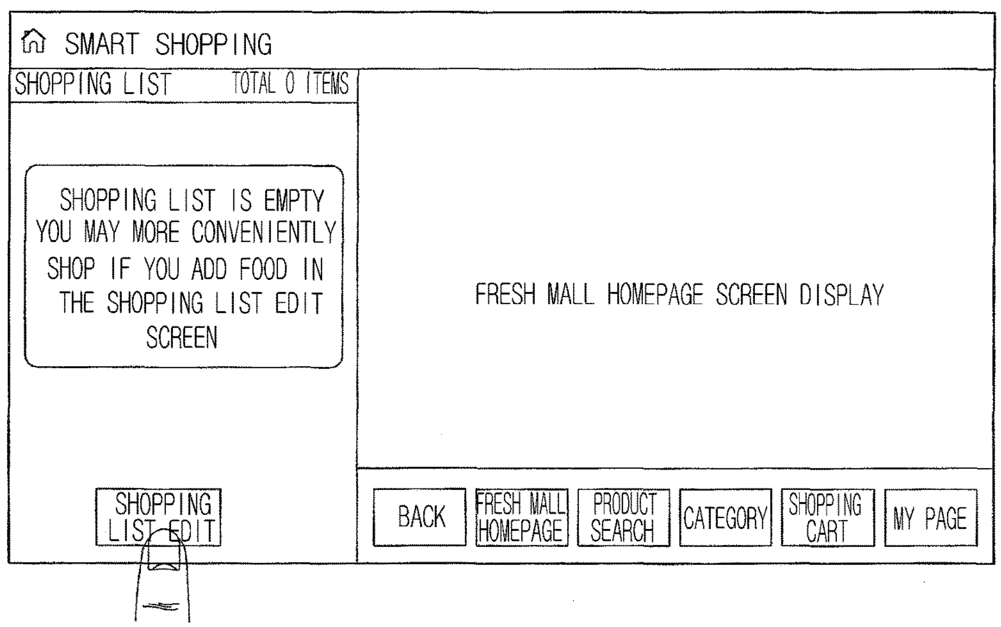

FIGS. 12A to 12C are diagrams exemplarily illustrating an operation of connection to the purchase site when the purchase list is empty. When the user presses the 'smart' button on the refrigerator management main (initial) screen as illustrated in FIG. 12A, the output unit 140 displays the main screen on the display as illustrated in FIG. 12B. Here, if the user taps on the 'shopping' button provided on the bottom of the screen without performing an operation of adding food, the output unit 140 displays a purchase screen on which both the purchase list and the purchase site are displayed, as illustrated in FIG. 12C. Here, if the user taps on the 'shopping list edit' button, the main screen for generating the purchase list is displayed on the display as illustrated in FIG. 12B.

Figure 15A:
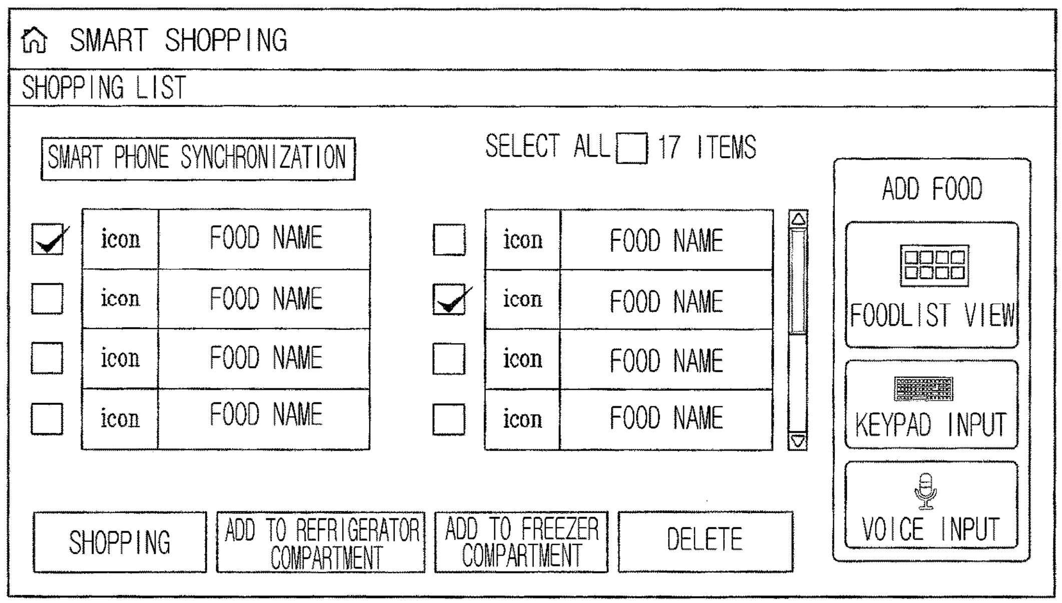
FIGS. 15A to 15D are diagrams illustrating an operation of deleting a part or the entirety of the products in the purchase list according to an embodiment.
Figure 15B:
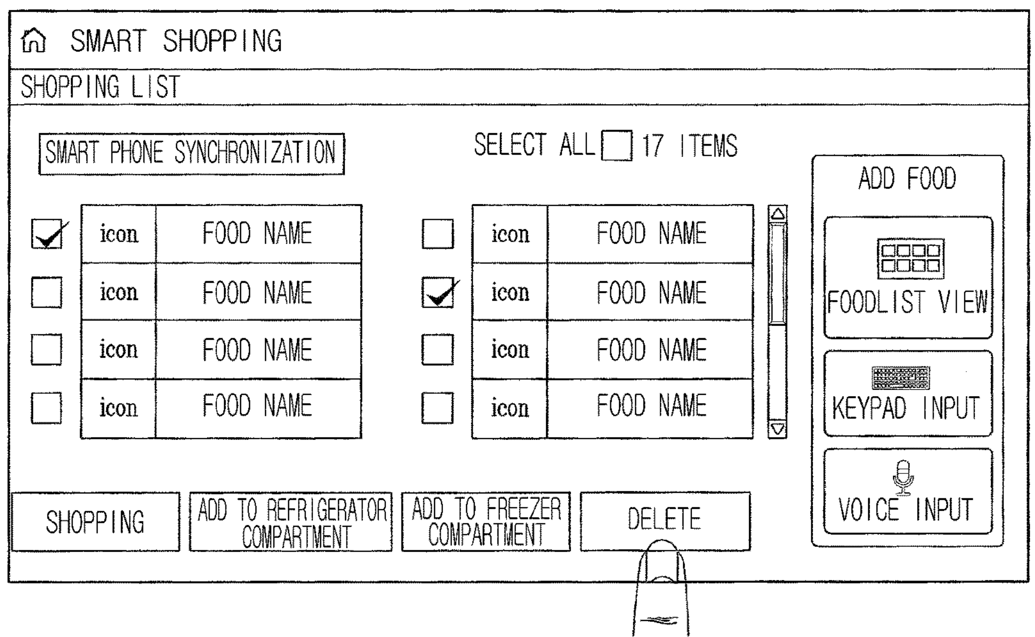
Figure 15C:
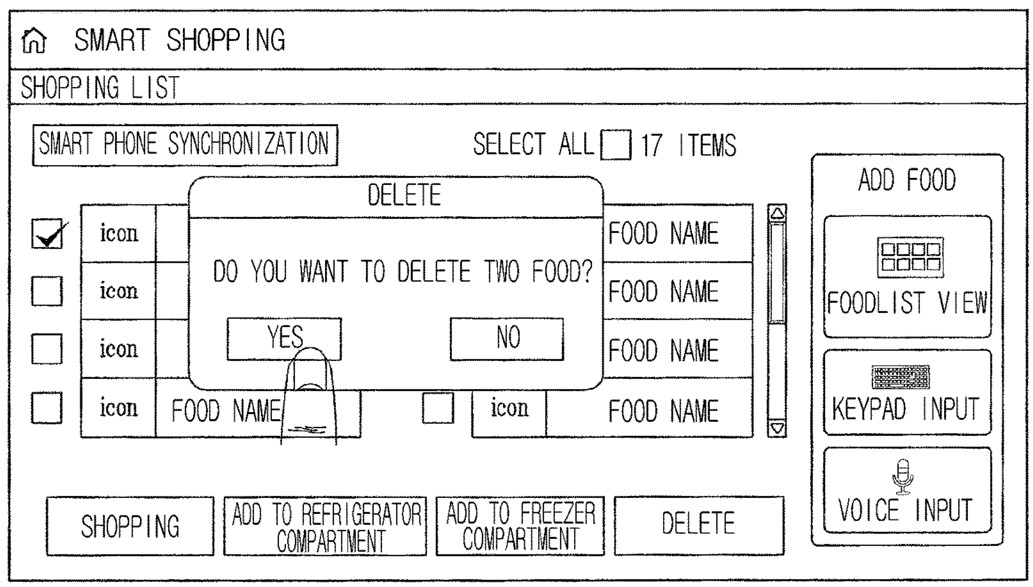
Figure 15D:
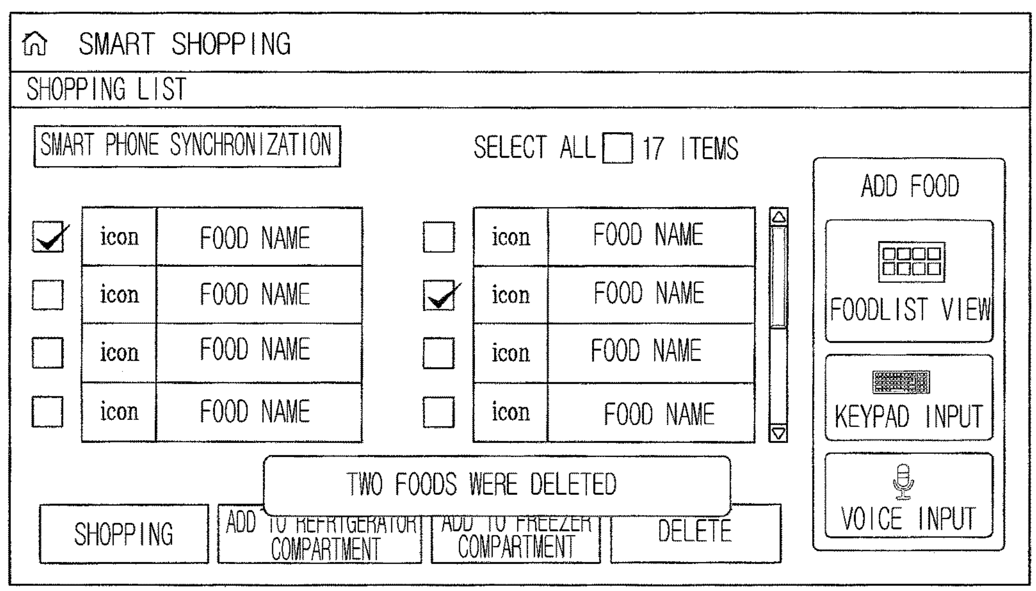

Referring to FIGS. 15A to 15D, the user may select and delete a part or the entirety of the products in the purchase list. When the user selects two foods from among the foods included in the purchase list as illustrated in FIG. 15A and then taps on the 'delete' button as illustrated in FIG. 15B, a message window saying 'do you want to delete two foods?' may pop up on the screen, as illustrated in FIG. 15C. Here, as illustrated in FIG. 15D, if the user wants to delete the foods, a message saying 'two foods were deleted' is displayed on the display and the two foods are deleted from the purchase list.

Figure 17A:
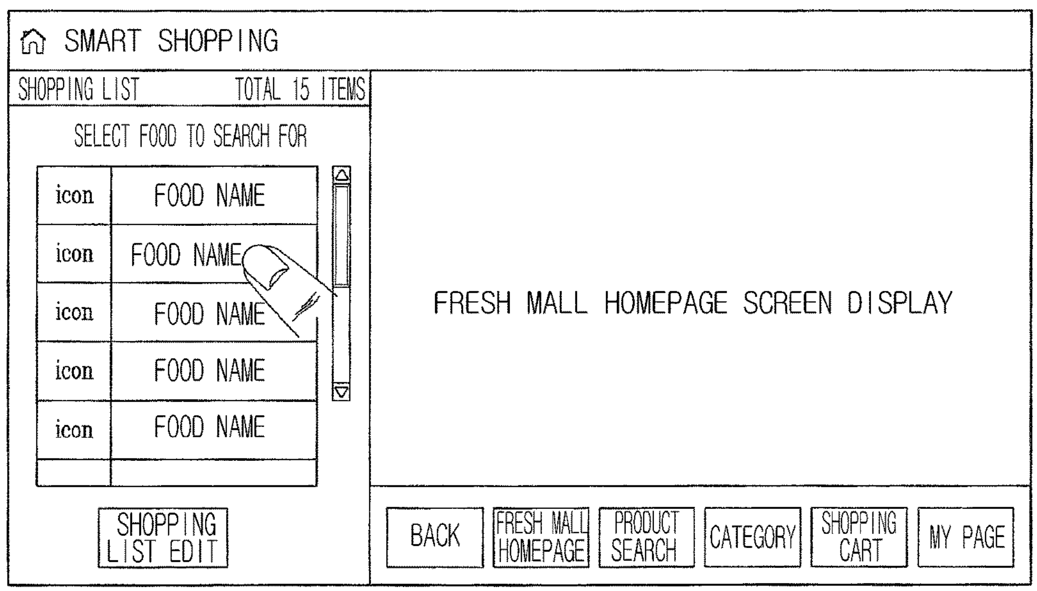
Figure 17B:
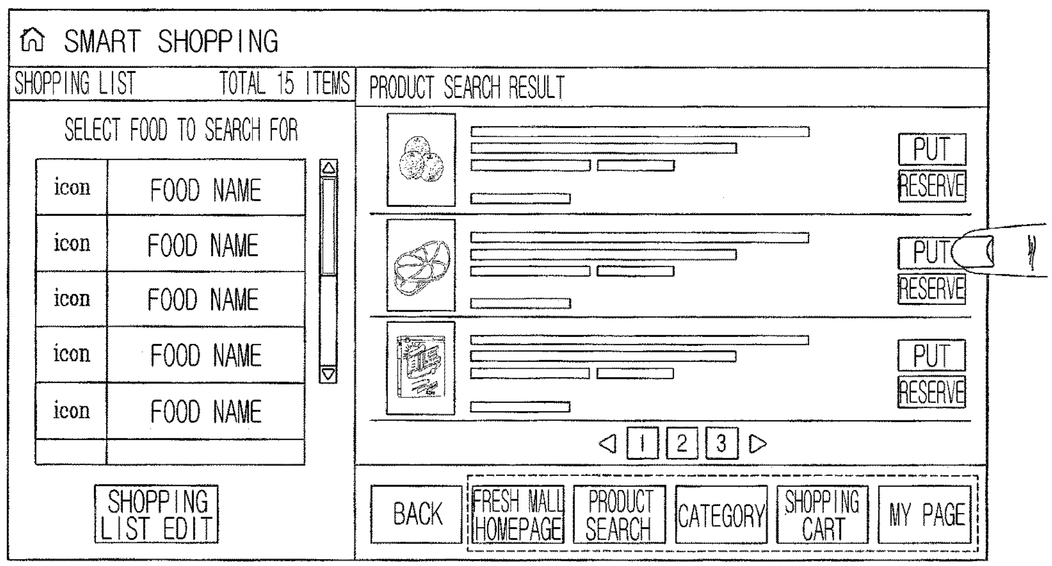

An operation of purchasing a product through the purchase site will be described with reference to FIGS. 17A to 17G. The detailed information on the products in the purchase list displayed on the first region may be displayed on the second region where the purchase site is displayed. When the user selects a food name or an icon on the display screen on which the purchase list and the purchase site are displayed as illustrated in FIG. 17A, a search result is displayed on the second region as illustrated in FIG. 17B. When the user 'puts' one food from the search result displayed on the display screen, a put-into-shopping-cart confirmation may be displayed on the second region.

Figure 17C:
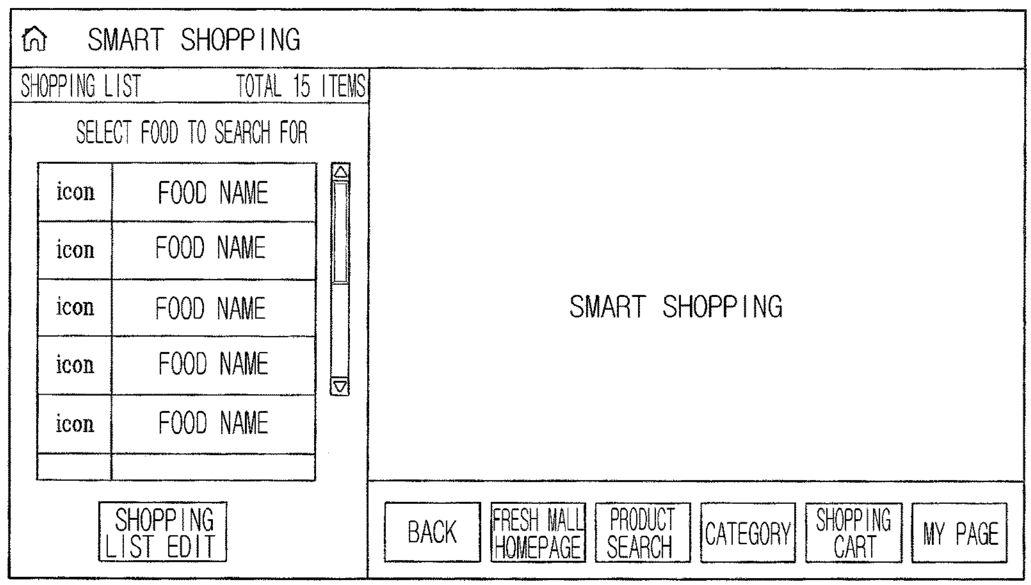

When the 'shopping cart' button is selected in FIG. 17C, an information window for actually purchasing a food may be displayed on the display screen. Here, a list of the foods selected from the purchase list may be displayed on the information window. At least one of purchase site information, information on names of the foods selected from the purchase list, information on the number of the foods, information on prices of the foods, discounted price information, and total food price information may be displayed on the information window. A checkbox selected to delete a food from the displayed list may be activated in the information window. Furthermore, a delete button for deleting a selected food and an order button (or purchase button) for making an order may be displayed on the information window. For another example, the delete button and the order button may be displayed on a region of the display screen other than the information window.

Figure 17D:
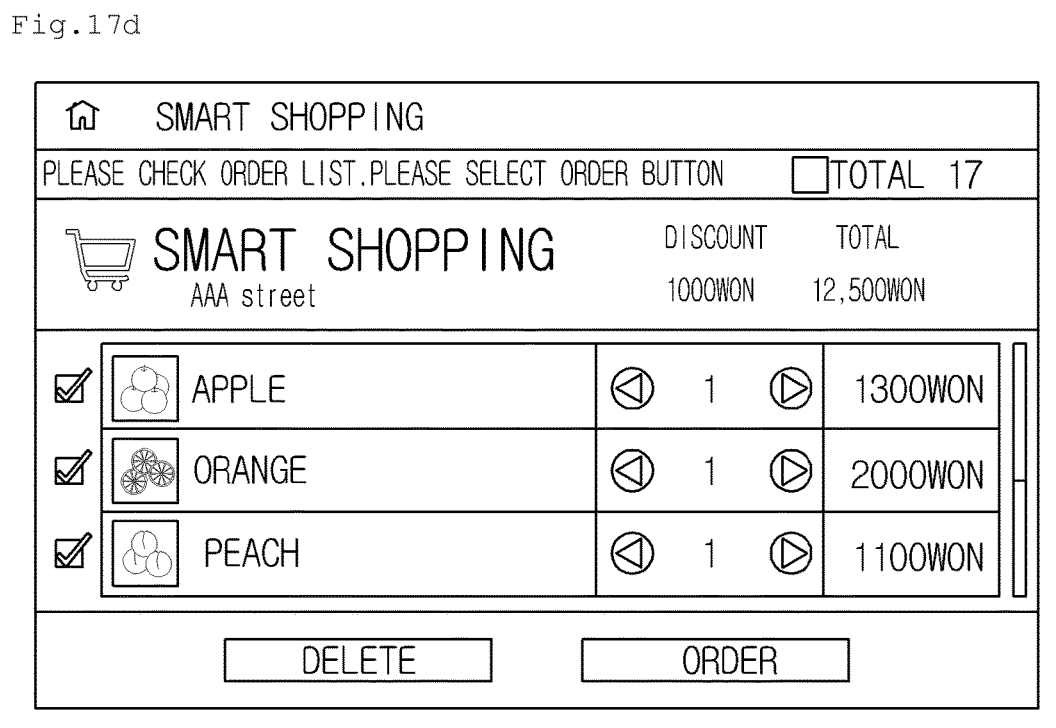
Figure 17E:
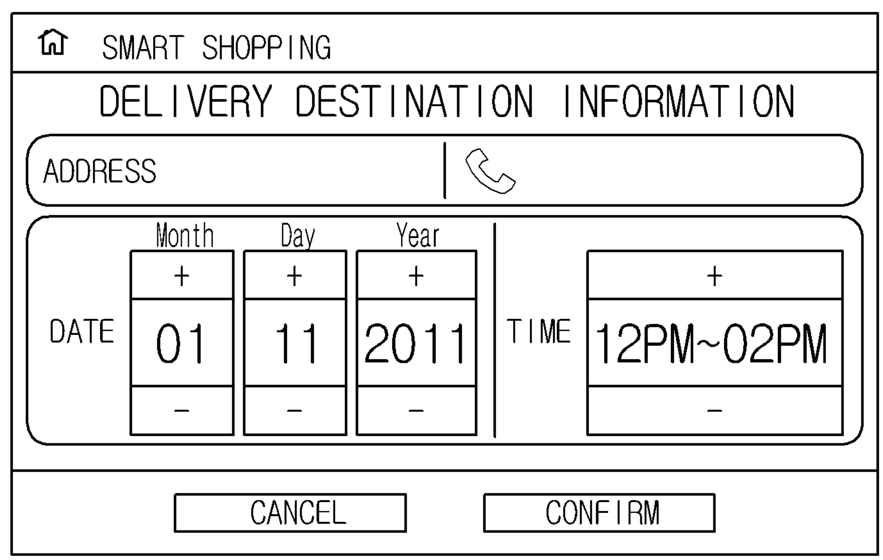

When the order button is selected in FIG. 17D, an input window for inputting delivery destination information may be displayed on the display screen as illustrated in FIG. 17E. A detailed input window for inputting an address of the delivery destination, a contact number, and delivery date and time may be displayed on the input window. Further, a cancel button for cancelling the order and a confirmation button selected when the input is completed may be displayed on the input window.

When the confirmation button is selected in FIG. 17E, an input window for inputting payment information may be displayed on the display screen as illustrated in FIG. 17F. A credit card selection window, a card number input window, a security number input window, and an expiration date information input window may be displayed on the input window. Further, a cancel button for cancelling the order and a confirmation button selected when the input is completed may be displayed on the input window.

Figure 17G:
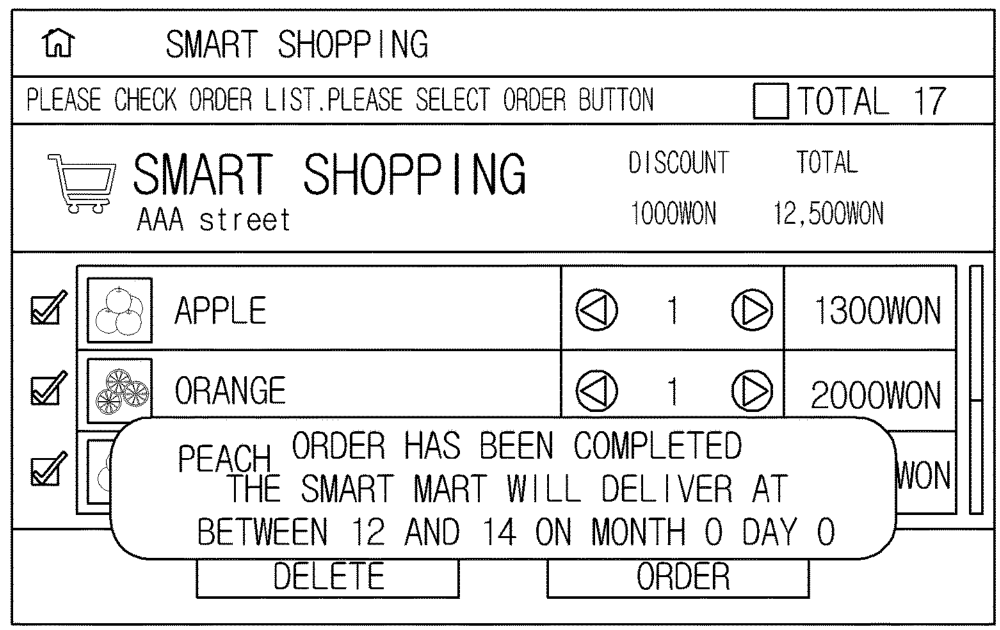

When the confirmation button is selected in FIG. 17E, information for notifying order completion may be displayed as illustrated in FIG. 17G. The information may include a message saying 'Order has been completed. The Smart Mart will deliver at between 12 and 14 on month 0 day 0'. That is, the information may include delivery date and time information.

Figure 19:
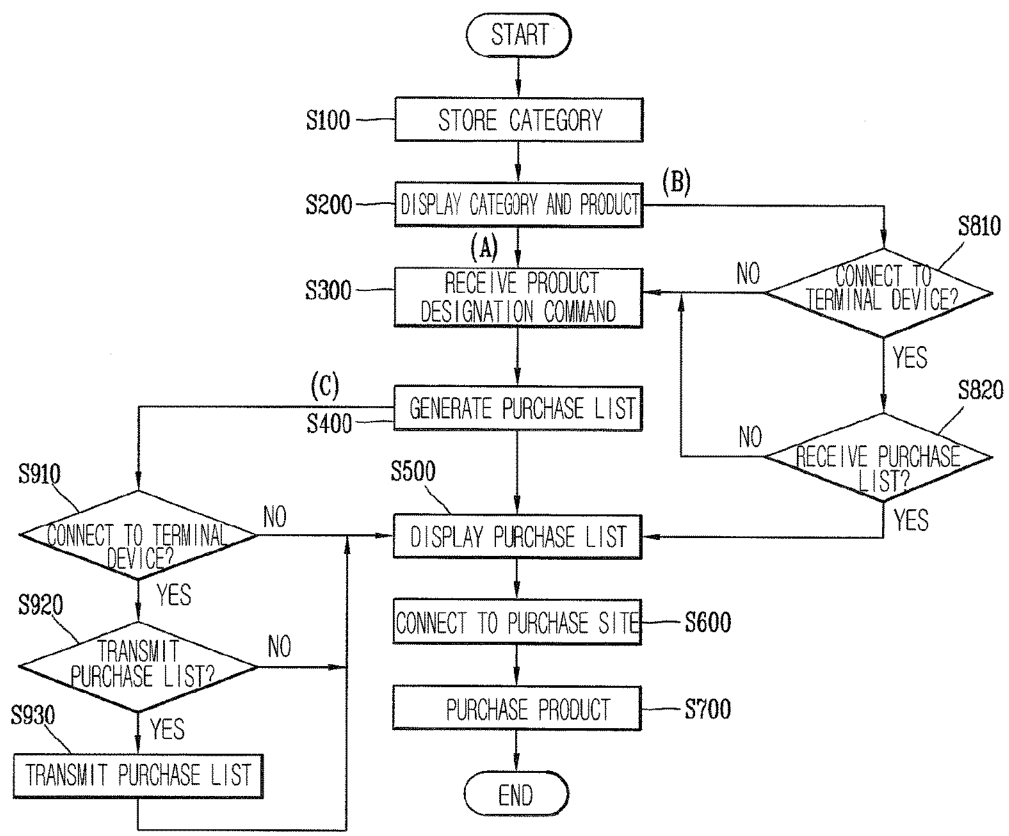
FIGS. 19 and 20 are flowcharts illustrating a product purchasing method using the home appliance according to embodiments.

Referring to FIG. 19, the product purchasing method using the home appliance according to an embodiment includes receiving the designation command for at least one product (operation S300), generating the purchase list according to the designation command (operation S400), and requesting purchase of the product in the purchase list using a connectable purchase site (operation S700). The flowchart illustrating the product purchasing method may be performed by a control unit.

The receiving of the designation command (operation S300) may be performed by at least one of touch input, keypad input, and voice input to the display screen.

Figure 20:
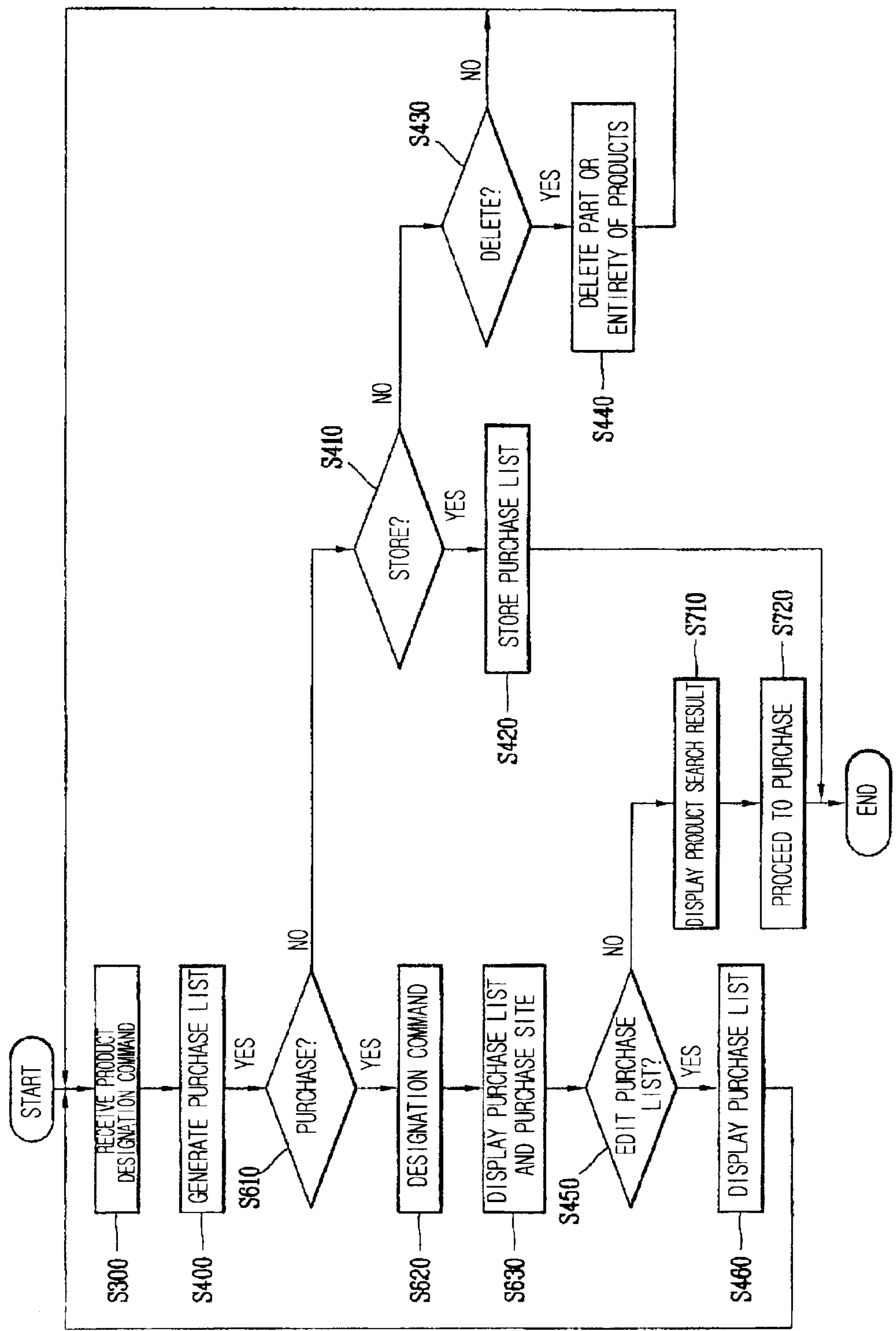

When the user presses the 'smart' button on the home appliance management screen as illustrated in FIG. 11A, the output unit 140 displays the main screen on the display as illustrated in FIG. 11B. When the user taps on one of the buttons of the food addition region, for example, the 'food list view' button, a food addition screen is displayed on the display as illustrated in FIG. 11C. That is, when the user taps on the 'food list view' button displayed on the main screen, a list of selectable foods is displayed as illustrated in FIG. 11C. That is, according to a simple touch input by the user, the designation command for food may be inputted (operation S200). As illustrated in FIG. 11D, the user may select a category and then may select at least one of foods in the category. When the user presses the 'add' button after selecting foods (operation S300) as illustrated in FIG. 11E, the purchase list including the selected foods is generated as illustrated in FIG. 11F (operation S400). As illustrated in FIG. 20, the memory may store the generated purchase list (operation S420).

Referring to FIG. 19, the product purchasing method may further include transmitting the purchase list to the external terminal device (operation S910). As illustrated in (C) of FIG. 19, the home appliance may be connected to the terminal device (operation S910) and may transmit the purchase list to the terminal device (operations S920 and S930). The product purchasing method may further include receiving the pre-generated purchase list from the external terminal device (operation S820). As illustrated in (B) of FIG. 19, the home appliance may be connected to the terminal device (operation S810) and may receive the purchase list from the terminal device to display the purchase list on the display screen (operation S820).

As illustrated in FIG. 7, the 'smart phone synchronization' button is displayed on the display, and the guide message window pops up when the user taps on the button. As illustrated in FIG. 7, the message saying 'do you want to transmit or read data to or from smart phone?' may be displayed on the message window.

When the user taps on the 'smart phone synchronization' button on the display screen illustrated in FIG. 13A, the output unit allows a message window to pop up on the display screen as illustrated in FIG. 13B. As illustrated in FIG. 13C, when the user presses the 'transmit' button (operation S920), the message window saying 'data of refrigerator and smart phone are being synchronized' pops up on the display and the purchase list generated in the refrigerator is transmitted to the smart phone (operation S930). When the transmission of the purchase list is normally completed, the display displays the confirmation message as illustrated in FIG. 13D.

Referring to FIG. 19, the product purchasing method may further include categorizing and storing purchasable object products (operation S100). The product purchasing method may further include storing the designation frequency or the purchase frequency for each of the object products.

The purchasable object products may be categorized and stored in the memory (operation S100). The memory may further store the designation frequency or the purchase frequency for each of the object products. FIG. 8 is a diagram illustrating an exemplary display screen for describing an operation of selecting a product using a category or a frequency. For example, when the user taps on the 'food list view' button displayed on the main screen, a list of selectable foods is displayed as illustrated in FIG. 8. That is, according to a simple touch input by the user, the designation command for food may be inputted (operation S200).

Referring to FIG. 20, the product purchasing method may further include deleting a part or the entirety of the object products from the purchase list (operation S440). The flowchart illustrating the product purchasing method may be performed by a control unit.

Referring to FIGS. 15A to 15D, the user may select and delete a part or the entirety of the products in the purchase list. When the user selects at least one food from among the foods included in the purchase list as illustrated in FIG. 15A and then taps on the 'delete' button as illustrated in FIG. 15B, the message window saying 'do you want to delete two foods?' may pop up on the screen, as illustrated in FIG. 15C. Here, as illustrated in FIG. 15D, if the user wants to delete the foods, a message saying 'two foods were deleted' is displayed on the display and the two foods are deleted from the purchase list.

Referring to FIG. 20, the product purchasing method further includes dividing the display screen provided to one side of the home appliance into two or more regions (operation S620), and displaying the purchase list and the purchase site on the first region and the second region respectively at the same time (operation S630). The product purchasing method may further include displaying a result of search for at least one product on the second region.

The displaying of the purchase site may include displaying a plurality of connectable purchase sites on the display screen, receiving a command for selecting one purchase site from among the plurality of purchase sites, and displaying the purchase site when the selection command is inputted.

The display screen may be divided into two or more regions (operation S620). The output unit may display the purchase list on the first region and display the purchase site on the second region at the same time. FIG. 9 is a diagram illustrating an exemplary display screen on which both the purchase list and the purchase site are displayed. The total number of foods included in the purchase list may be displayed on the first region. The display may display a food name together with an icon or an image. The display may further display a button for editing the purchase list (shopping list). When the purchase list is empty, the guide message saying 'purchase list is empty' may be displayed on the first region. Here, the 'shopping list edit' button may be activated. If the user taps on the 'shopping list edit' button, the main screen for generating the purchase list is displayed on the display, and the user may generate the purchase list (operation S460). A screen of the purchase site, i.e., a connectable shopping site (fresh mall homepage), is displayed on the second region. Furthermore, the display may display a button so that a function according to the displayed purchase site is performed. For example, the display may display 'back', 'fresh mall homepage', 'product search', 'category', 'shopping cart', and 'my page' buttons related to the purchase site. Initially, the 'back' button may be deactivated.

The output unit may display a result of search for at least one object product on the second region. FIG. 10 is a diagram illustrating an exemplary display screen on which a result of searching the purchase site for the products in the purchase list is displayed. Referring to FIG. 10, when the user selects a food name or an icon in the purchase list, a result of search for the selected food is displayed on the region where the purchase site is displayed, i.e., the second region (operation S710).

Referring to FIGS. 16A to 16D, detailed information on a product in the purchase list may be provided through the purchase site. That is, the detailed information on the products in the purchase list displayed on the first region may be displayed on the second region where the purchase site is displayed. When the user selects a food name or an icon on the display screen on which the purchase list and the purchase site are displayed as illustrated in FIG. 16A, a search result is displayed on the second region as illustrated in FIG. 16B. When the user selects a single item from the search result displayed on the display screen, detailed food information screen is displayed on the second region as illustrated in FIG. 16C. Here, if the 'back' button is tapped, the search result screen is displayed as illustrated in FIG. 16B.

As described above, the home appliance, the product purchasing method using the home appliance, and the home appliance management system according to embodiments enable home appliances to be registered in the management system and managed so that a user may easily monitor or control the home appliances remotely. According to embodiments, products may be purchased online through the home appliance, and thus, waste of time or expense may be reduced. Furthermore, since the purchase list is shared in association with an external terminal device such as a smart phone, efficiency of product purchase is improved. According to embodiments, the home appliance management system is constructed using a network so that the refrigerator may be remotely controlled using the external terminal device and the generation of the purchase list, the connection to the purchase site, and the food purchase are performed through one screen of the refrigerator, thereby improving both stability of the refrigerator and convenience of the user.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A home appliance comprising:

an input unit arranged on one side of a main body of the home appliance to receive a designated command for at least one product;

a communication unit to transmit information to a server related to a purchase site or receive information from the server related to the purchase site;

an output unit to display, on a display screen, a purchase list according to the designated command; and a control unit to control the output unit to display on the display screen, wherein the control unit controls the output unit to display the purchase list on a first region of the display screen and one or more connectable purchase sites on a second region of the display screen, when a command to select one of the one or more purchase sites is received by the control unit, the output unit displays, on the display screen, the selected purchase site, wherein when at least one food from among the foods included in the purchase list is selected, the control unit controls the output unit to activate an add to refrigerator compartment button and an add to freezer compartment button on the display screen, and wherein the control unit controls the output unit to display on the display screen, a synchronization button to transmit the purchase list or to receive the purchase list from an external terminal device.

2. The home appliance of claim 1, wherein the control unit controls the output unit to display a result of search for the at least one product in the purchase list.

3. The home appliance of claim 2, wherein the result of the search comprises price information on the at least one product.

4. The home appliance of claim 1, wherein the control unit controls the output unit to display on the display screen, an information window for products selected from the purchase list.

5. The home appliance of claim 4, wherein the control unit controls the output unit to display on the information window, information on names, the number, and prices of the products selected from the purchase list.

6. The home appliance of claim 4, wherein the control unit controls the output unit to display on the display screen, an order button to order the products displayed on the information window, wherein, when the order button is selected, the output unit displays, on the display screen, an input window to input information on a delivery destination and delivery time and a confirmation button to select when the inputting is completed.

7. The home appliance of claim 6, wherein, when the confirmation button is selected, the control unit controls the output unit to display on the display screen, an input window to input payment information and a confirmation button to select when the inputting is completed.

8. The home appliance of claim 1, wherein the communication unit is connected to an external terminal device, to transmit the purchase list to the terminal device or to receive the purchase list from the terminal device.

9. The home appliance of claim 1, further comprising a memory to categorize and store products.

10. The home appliance of claim 9, wherein the memory further stores a designation frequency or a purchase frequency for each of the products.

11. The home appliance of claim 1, wherein the communication unit is connected to a home appliance management server through a communication network, receives a management command for the home appliance, and transmits a result of execution of the management command to the home appliance management server.

12. A method for purchasing a product using a home appliance, the method comprising:

receiving, by a control unit in the home appliance, a designated command for at least one product;

displaying on a display screen of the home appliance, by an output unit in the home appliance, a purchase list according to the designated command; and requesting, by the control unit, purchase of the product in the purchase list using a selected connectable purchase site, wherein the control unit controls the output unit to display the purchase list on a first region of the display screen and one or more connectable purchase sites on a second region of the display screen, when a command to select one of the one or more purchase sites is received by the control unit, the output unit displays, on the display screen, the selected connectable purchase site, wherein when at least one food from among the foods included in the purchase list is selected, the control unit controls the output unit to activate an add to refrigerator compartment button and an add to freezer compartment button on the display screen, and wherein the control unit controls the output unit to display on the display screen, a synchronization button to transmit the purchase list or to receive the purchase list from an external terminal device.

13. The method of claim 12, wherein the requesting by the control unit, the purchase comprises:

receiving by the control unit, delivery information for delivering a product selected from the purchase list;

receiving by the control unit, payment information for payment; and transmitting by the communication unit, the delivery information, the payment information, and the purchase list to a server related to the connectable purchase site.

14. The method of claim 12, further comprising categorizing and storing products in a memory by the control unit.

* * * * *